(12) United States Patent
Kanamaru et al.

(10) Patent No.: US 7,259,215 B2
(45) Date of Patent: Aug. 21, 2007

(54) PROCESS FOR PRODUCING PROPYLENE/ETHYLENE BLOCK COPOLYMER AND PROPYLENE/ETHYLENE BLOCK COPOLYMER

(75) Inventors: Masami Kanamaru, Chiba (JP); Hideo Funabashi, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 11 days.

(21) Appl. No.: 10/534,755

(22) PCT Filed: Nov. 11, 2003

(86) PCT No.: PCT/JP03/14317

§ 371 (c)(1),
(2), (4) Date: May 13, 2005

(87) PCT Pub. No.: WO2004/044013

PCT Pub. Date: May 27, 2004

(65) Prior Publication Data

US 2006/0014909 A1   Jan. 19, 2006

(30) Foreign Application Priority Data

Nov. 14, 2002   (JP) .............................. 2002-330762

(51) Int. Cl.
*C08F 4/52* (2006.01)
*C08F 4/76* (2006.01)

(52) U.S. Cl. .................. 526/119; 526/118; 526/126; 526/127; 526/129; 526/130; 526/160; 526/170; 526/943; 526/941

(58) Field of Classification Search ............... 526/116, 526/114, 113, 119, 130, 129, 160, 40, 943, 526/118, 126, 127, 170, 941
See application file for complete search history.

(56) References Cited

U.S. PATENT DOCUMENTS

| | | | |
|---|---|---|---|
| 5,696,045 A | * 12/1997 | Winter et al. | 502/113 |
| 5,854,165 A | * 12/1998 | Yabunouchi et al. | 502/117 |
| 6,171,994 B1 | * 1/2001 | Yabunouchi et al. | 502/117 |
| 6,316,561 B1 | * 11/2001 | Kanzawa | 526/160 |
| 6,339,135 B1 | * 1/2002 | Kashiwamura et al. | 526/160 |
| 6,576,306 B2 | * 6/2003 | Mehta et al. | 428/35.5 |
| 6,770,355 B1 | * 8/2004 | Minami et al. | 428/220 |
| 6,906,155 B1 | * 6/2005 | Minami et al. | 526/160 |

FOREIGN PATENT DOCUMENTS

| | | |
|---|---|---|
| EP | 0 645 401 A1 | 3/1995 |
| EP | 0 707 016 A1 | 4/1996 |
| JP | 07-173233 | 7/1995 |
| JP | 08-053509 | 2/1996 |
| JP | 11-292912 | 10/1999 |
| JP | 11-292912 A * | 10/1999 |
| JP | 2002-201322 | 7/2002 |
| JP | 2002-348343 | 12/2002 |
| JP | 2004-187553 | 7/2004 |

* cited by examiner

*Primary Examiner*—David W. Wu
*Assistant Examiner*—Rip A. Lee
(74) *Attorney, Agent, or Firm*—Oblon, Spivak, McClelland, Maier & Neustadt, P.C.

(57) ABSTRACT

A process for producing a propylene-ethylene block copolymer in a good morphology using a catalyst system comprising a metallocene catalyst (1) preparing high crystalline polypropylene, a metallocene catalyst (2) preparing low crystalline polypropylene, a porous carrier (3), aluminoxane (4) or a compound (4) which can be reacted with the metallocene catalysts described above to form an ionic complex and, if necessary, an organic aluminum compound (5) and a propylene-ethylene block copolymer. The resultant compound has a high transparency and a low elastic modulus.

18 Claims, No Drawings

PROCESS FOR PRODUCING PROPYLENE/ETHYLENE BLOCK COPOLYMER AND PROPYLENE/ETHYLENE BLOCK COPOLYMER

TECHNICAL FIELD

The present invention relates to a process for producing a propylene-ethylene block copolymer having a high transparency and a low elastic modulus in a good morphology and a propylene-ethylene block copolymer obtained by the above process.

BACKGROUND ART

In recent years, substitution of soft polyolefin resins for soft polyvinyl chloride resins is investigated because of an endocrine problem and problems such as generating dioxin in burning.

Disclosed is a process in which soft polyolefin materials having a high transparency can be produced in a good morphology (for example, Japanese Registered Patent No. 3240589), but when they are used for films and wraps, the transparency equivalent to those of polyvinyl chloride resins is not obtained.

Further, disclosed is a process for producing soft materials having a high transparency in which a metallocene catalyst is used (for example, Japanese Unexamined Patent Application Laid-Open No. 95820/2000), but because a polymer produced in a solution used in the production is completely dissolved, a viscosity of the solution goes up, and a concentration of the polymer in the solution can not be raised, so that the productivity is low.

The present invention relates to a process for producing a propylene-ethylene block copolymer having a high transparency and a low elastic modulus in a good morphology and a propylene-ethylene block copolymer obtained by the above process.

DISCLOSURE OF THE INVENTION

Intensive researches repeated by the present inventors in order to achieve the object described above have resulted in finding that though it has so far been impossible to produce low crystalline polypropylene while maintaining powder particles only with a metallocene catalyst providing low crystalline polypropylene which is carried on a carrier, a propylene-ethylene block copolymer in which powder particles are not stuck and which has a high transparency can be produced by carrying a metallocene catalyst providing low crystalline polypropylene in combination with a metallocene catalyst providing high crystalline polypropylene on a carrier, and thus they have come to complete the present invention.

That is, the present invention provides:

1. a process for producing a propylene-ethylene block copolymer in which propylene is copolymerized with ethylene using a catalyst system comprising a metallocene catalyst (1) preparing high crystalline polypropylene, a metallocene catalyst (2) preparing low crystalline polypropylene, a porous carrier (3), aluminoxane (4) or a compound (4) which can be reacted with the metallocene catalysts described above to form an ionic complex and, if necessary, an organic aluminum compound (5);

2. the process for producing the propylene-ethylene block copolymer as described in the above item 1, wherein the propylene is polymerized in a first step, and propylene and ethylene are random-copolymerized in a second step;

3. the process for producing the propylene-ethylene block copolymer as described in the above item 2, wherein the propylene-ethylene block copolymer satisfies the following requirement of:

(1) a triad chain fraction $f_{EEE}$ of [EEE]$\leq$0.1 (mole %), (2) R1·R2$\geq$0.5, (3) its intrinsic viscosity [$\eta$]$\geq$1.0 dl/g and (4) a intrinsic viscosity [$\eta$] of a xylene-soluble fraction$\geq$1.0 dl/g;

4. the process for producing the propylene-ethylene block copolymer as described in the above item 1 or 2, wherein the metallocene catalyst preparing high crystalline polypropylene is a monocross-linked metallocene catalyst, and the metallocene catalyst preparing low crystalline polypropylene is a dicross-linked metallocene catalyst;

5. the process for producing the propylene-ethylene block copolymer as described in the above item 4, wherein the monocross-linked metallocene catalyst is a transition metal compound represented by general formula (I):

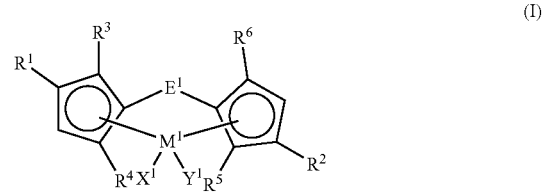

wherein $E^1$ represents a bonding group which cross-links two conjugate five-membered ring ligands; $R^1$ and $R^2$ each represent a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; $R^3$ to $R^6$ each represent hydrogen, a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; $M^1$ represents a transition metal of the IV to VI group in the periodic table; $X^1$ and $Y^1$ each represent a covalent ligand; and $X^1$ and $Y^1$ may be combined with each other to form a ring structure; and the dicross-linked metallocene catalyst is a transition metal compound represented by general formula (II) or general formula (III):

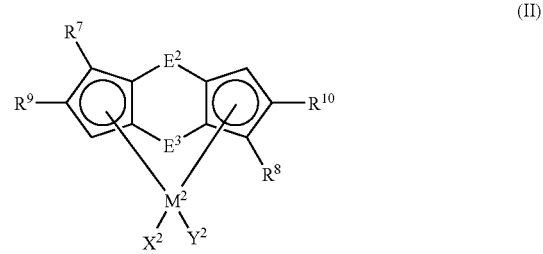

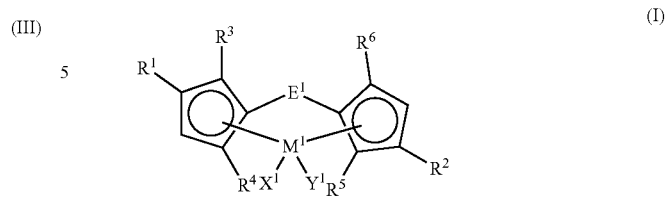

(I)

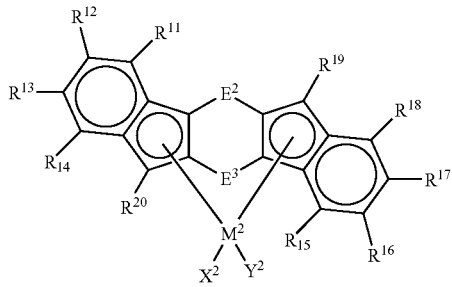

(III)

wherein $E^1$ represents a bonding group which cross-links two conjugate five-membered ring ligands; $R^1$ and $R^2$ each represent a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; $R^3$ to $R^6$ each represent hydrogen, a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; $M^1$ represents a transition metal of the IV to VI group in the periodic table; $X^1$ and $Y^1$ each represent a covalent bonding ligand; and $X^1$ and $Y^1$ may be combined with each other to form a ring structure.

The hydrocarbon groups of $R^1$ and $R^2$ are preferably the groups having 1 to 20 carbon atoms, particularly preferably the groups having 1 to 12 carbon atoms.

This hydrocarbon group may be combined as a monovalent group with a cyclopentadienyl group which is a conjugate five-membered ring group, and when they are present in a plural number, two groups of $R^1$, $R^3$ and $R^4$ or two groups of $R^2$, $R^5$ and $R^6$ may be combined.

The above conjugate five-membered ring is a substituted or non-substituted cyclopentadienyl group, an indenyl group and a fluorenyl group.

The halogen atom includes chlorine, bromine, iodine and fluorine atoms, and the alkoxy group includes preferably the group having 1 to 12 carbon atoms.

$E^1$ includes (1) an alkylene group having 1 to 4 carbon atoms, a cycloalkylene group or a side chain lower alkyl or phenyl-substituted group thereof, such as methylene, ethylene, isopropylene, methylphenylmethylene, diphenylmethylene and cyclohexylene, (2) a silylene group, an oligosilylene group or a side chain lower alkyl or phenyl-substituted group thereof, such as silylene, dimethylsilylene, methylphenylene, diphenylsilylene, disilylene and tetramethyldisilylene and (3) a hydrocarbon group containing germanium, phosphorus, nitrogen, boron or aluminum [a lower alkyl group, a phenyl group, a hydrocarbyloxy group (preferably a lower alkoxy group) and the like], to be specific, $(CH_3)_2Ge$, $(C_6H_5)_2Ge$, $(CH_3)P$, $(C_6H_5)P$, $(C_4H_9)N$, $(C_6H_5)N$, $(CH_3)B$, $(C_4H_9)B$, $(C_6H_5)B$, $(C_6H_5)Al$ and $(CH_3O)Al$.

Among them, the alkylene groups and the silylene groups are preferred.

$M^1$ represents a transition metal of the IV to VI group in the periodic table, and to be specific, titanium, zirconium, hafnium, niobium, molybdenum and tungsten can be given. Among them, titanium, zirconium and hafnium are preferred, and zirconium is particularly suited.

$X^1$ and $Y^1$ each are covalent bonding ligands, and to be specific, they represent a hydrogen atom, a halogen atom, a wherein $E^2$ and $E^3$ represent a bonding group which cross-links two conjugate five-membered ring ligands; $R^9$ to $R^{18}$ each represent hydrogen, a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; $R^7$, $R^8$, $R^{19}$ and $R^{20}$ each represent a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; $M^2$ represents a transition metal of the IV to VI group in the periodic table; $X^2$ and $Y^2$ each represent a covalent bonding ligand; and $X^1$ and $Y^1$ may be combined with each other to form a ring structure;

6. the process for producing the propylene-ethylene block copolymer as described in the above item 4, wherein the monocross-linked metallocene catalyst is dimethylsilylenebis(2-methylbenzoindenyl)zirconium dichloride or dimethylsilylenebis(2-methyl-4-phenylindenyl)zirconium dichloride, and the dicross-linked metallocene catalyst is (1,2'-dimethylsilylene)(2,1'-dimethylsilylene)-bis(3-trimethylsilylmethylindenyl)zirconium dichloride or (1,2'-dimethylsilylene)(2,1'-dimethylsilylene)-bis(3-n-butylindenyl)zirconium dichloride;

7. a propylene-ethylene block copolymer produced by the process as described in the above item 1 or 2; and 8. the propylene-ethylene block copolymer as described in the above item 7, wherein an elastic modulus E is less than 330 (MPa), and an internal haze H is less than 55(%).

BEST MODE FOR CARRYING OUT THE INVENTION

The present invention shall be explained in details below.

The metallocene catalyst (1) preparing high crystalline polypropylene used for the production process of the present invention for a propylene-ethylene block copolymer includes a monocross-linked metallocene catalyst.

The monocross-linked metallocene catalyst includes a transition metal compound represented by general formula (I):

hydrocarbon group having 1 to 20 carbon atoms, preferably 1 to 10 carbon atoms, an alkoxy group having 1 to 20 carbon atoms, preferably 1 to 10 carbon atoms, an amino group, a phosphorus-containing hydrocarbon group having 1 to 20 carbon atoms, preferably 1 to 12 carbon atoms (for example, a diphenylphosphine group and the like), a silicon-containing hydrocarbon group having 1 to 20 carbon atoms, preferably 1 to 12 carbon atoms (for example, a trimethylsilyl group and the like), a hydrocarbon group having 1 to 20 carbon atoms, preferably 1 to 12 carbon atoms or a halogen-containing boron compound (for example, $BF_4$ and $B(C_6H_5)_4$).

Among them, the halogen atom and the hydrocarbon group are preferred.

The above $X^1$ and $Y^1$ may be the same as or different from each other.

The specific examples of the transition metal compound represented by the general formula (I) include the following compounds.

(i) Transition metal compounds having two conjugate five-membered ring ligands which are cross-linked by alkylene groups, such as methylenebis(indenyl)titanium dichloride, ethylenebis(indenyl)titanium dichloride, methylenebis(indenyl)titanium chlorohydride, ethylenebis(indenyl)methyltitanium chloride, ethylenebis(indenyl)methoxychlorotitanium, ethylenebis(indenyl)titanium diethoxide, ethylenebis(indenyl)dimethyltitanium, ethylenebis(4,5,6,7-tetrahydroindenyl)titanium dichloride, ethylenebis(2-methylindenyl)titanium dichloride, ethylenebis(2,4,7-trimethylindenyl)-titanium dichloride, ethylenebis(2-methyl-4,5-benzoindenyl)titanium dichloride, ethylenebis(2-methyl-4-phenylindenyl)titanium dichloride, ethylenebis(2-methyl-4,5,6,7-tetramethylindenyl)-titanium dichloride, ethylenebis(2-methyl-5,6-dimethylindenyl) titanium dichloride, ethylenebis(2-methyl-4-(1-naphthyl)indenyl)titanium dichloride, ethylenebis(2-methyl-4-(2-naphthyl)indenyl)titanium dichloride, ethylenebis(2-methyl-4-i-propylindenyl)titanium dichloride, ethylenebis(2-ethyl-4-phenylindenyl)titanium dichloride, ethylenebis(2-methyl-4-toluylindenyl) titanium dichloride, ethylenebis(2,4-dimethylindenyl) titanium dichloride, ethylenebis(2-methyl-4-trimethylsilylindenyl)titanium dichloride, ethylenebis(2,4-dimethyl-5,6,7-trihydroindenyl)-titanium dichloride, ethylene(2,4-dimethylcyclopentadienyl)(3',5'-dimethylcyclopentadienyl)titanium dichloride, ethylene(2-methyl-4-t-butylcyclopentadienyl)(3'-t-butyl-5'-methylcyclopentadienyl)titanium dichloride, ethylene(2,3,5-trimethylcyclopentadienyl)(2',4',5'-trimethylcyclopentadienyl)titanium dichloride, isopropylidenebis(2-methylindenyl)titanium dichloride, isopropylidenebis(indenyl)titanium dichloride, isopropylidenebis(2,4-dimethylindenyl)titanium dichloride, isopropylidene(2,4-dimethylcyclopentadienyl)(3',5'-dimethylcyclopentadienyl)titanium dichloride, isopropylidene (2-methyl-4-t-butylcyclopentadienyl)-(3'-t-butyl-5'-methylcyclopentadienyl)titanium dichloride, ethylenebis (2-methylbenzoindenyl)titanium dichloride and ethylenebis(benzoindenyl)titanium dichloride and (ii) transition metal compounds having two conjugate five-membered ring ligands which are cross-linked with a silylene group, such as dimethylsilylenebis(indenyl)titanium dichloride, dimethylsilylenebis(indenyl)methyltitanium chloride, dimethylsilylenebis(indenyl)methoxychlorotitanium, dimethylsilylenebis(indenyl)titanium diethoxide, dimethylsilylenebis(indenyl)dimethyltitanium, dimethylsilylenebis(4,5,6,7-tetrahydroindenyl)-titanium dichloride, dimethylsilylenebis(2-methylindenyl) titanium dichloride, dimethylsilylenebis(2,4,7-trimethylindenyl)titanium dichloride, dimethylsilylenebis (2-methyl-4,5-benzoindenyl)titanium dichloride, dimethylsilylenebis(2-methyl-4-phenylindenyl)titanium dichloride, dimethylsilylenebis(2-methyl-4,5,6,7-tetramethylindenyl)titanium dichloride, dimethylsilylenebis(2-methyl-5,6-dimethylindenyl)-titanium dichloride, dimethylsilylenebis(2-methyl-4-(1-naphthyl)indenyl) titanium dichloride, dimethylsilylenebis(2-methyl-4-(2-naphthyl)indenyl)-titanium dichloride, dimethylsilylenebis(2-methyl-4-i-propylindenyl)titanium dichloride, dimethylsilylenebis(2-ethyl-4-phenylindenyl) titanium dichloride, dimethylsilylenebis(2-methyl-4-phenylindenyl)titanium dichloride, dimethylsilylenebis(2-methyl-4-toluylindenyl)titanium dichloride, dimethylsilylenebis(2,4-dimethylindenyl)-titanium dichloride, dimethylsilylenebis(2-methyl-4-trimethylsilylindenyl)titanium dichloride, dimethylsilylenebis(2,4-dimethyl-5,6,7-trihydroindenyl)titanium dichloride, dimethylsilylene(2,4-dimethylcyclopentadienyl)(3',5'-dimethylcyclopentadienyl)titanium dichloride, dimethylsilylene(2-methyl-4-t-butylcyclopentadienyl)-(3'-t-butyl-5'-methylcyclopentadienyl)titanium dichloride, dimethylsilylene(2,3,5-trimethylcyclopentadienyl) (2',4',5'-trimethylcyclopentadienyl)titanium dichloride, isopropylidenebis(2-methylindenyl)titanium dichloride, isopropylidenebis(indenyl)titanium dichloride, isopropylidenebis(2,4-dimethylindenyl)titanium dichloride, isopropylidene(2,4-dimethylcyclopentadienyl)(3',5'-dimethylcyclopentadienyl)titanium dichloride, isopropylidene (2-methyl-4-t-butylcyclopentadienyl)-(3'-t-butyl-5'-methylcyclopentadienyl)titanium dichloride, dimethylsilylenebis(2-methylbenzoindenyl)titanium dichloride and dimethylsilylenebis(benzoindenyl)titanium dichloride.

The specific examples further include compounds obtained by substituting a chlorine atom of the above compounds described in (i) and (ii) above, with a bromine atom, an iodine atom, methyl or phenyl and compounds obtained by substituting titanium which is a central metal in the transition metal compounds described above with zirconium, hafnium, niobium and tungsten.

The metallocene catalyst (2) preparing low crystalline polypropylene used in the process for producing the propylene-ethylene block copolymer of the present invention includes a dicross-linked metallocene catalyst.

The dicross-linked metallocene catalyst includes a transition metal compound represented by general formula (II) or (III):

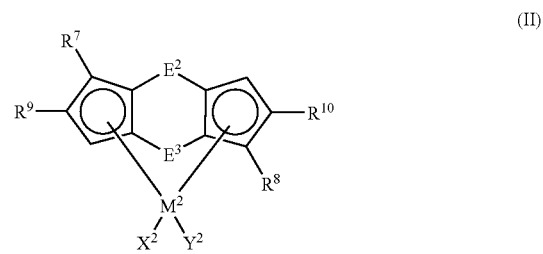

(II)

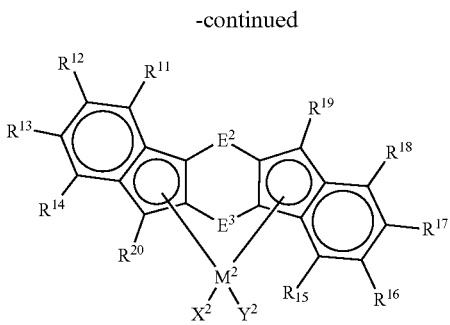

(III)

wherein $E^2$ and $E^3$ represent a bonding group which cross-links two conjugate five-membered ring ligands; $R^9$ to $R^{18}$ each represent hydrogen, a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; $R^7$, $R^8$, $R^{19}$ and $R^{20}$ each represent a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; $M^2$ represents a transition metal of the IV to VI group in the periodic table; $X^2$ and $Y^2$ each represent a covalent bonding ligand; and $X^1$ and $Y^1$ may be combined with each other to form a ring structure).

The hydrocarbon groups of $R^7$ to $R^{20}$ are preferably the groups having 1 to 20 carbon atoms, particularly preferably the groups having 1 to 12 carbon atoms.

This hydrocarbon group may be combined as a monovalent group with a cyclopentadienyl group which is a conjugate five-membered ring group. When they are present in a plural number, $R^7$ and $R^9$ or $R^8$ and $R^{10}$ may be combined in general formula (II), and two groups of $R^{11}$ to $R^{14}$ and $R^{20}$ or $R^{15}$ to $R^{19}$ may be combined.

The above conjugate five-membered ring is a substituted or non-substituted cyclopentadienyl group, an indenyl group and a fluorenyl group.

The halogen atom includes chlorine, bromine, iodine and fluorine atoms, and the alkoxy group includes preferably the group having 1 to 12 carbon atoms.

$E^2$ and $E^3$ include (1) an alkylene group having 1 to 4 carbon atoms, a cycloalkylene group or a side chain lower alkyl or phenyl-substituted group thereof, such as methylene, ethylene, isopropylene, methylphenylmethylene, diphenylmethylene and cyclohexylene, (2) a silylene group, an oligosilylene group or a side chain lower alkyl or phenyl-substituted group thereof, such as silylene, dimethylsilylene, methylphenylene, diphenylsilylene, disilylene and tetramethyldisilylene and (3) a hydrocarbon group containing germanium, phosphorus, nitrogen, boron or aluminum [a lower alkyl group, a phenyl group, a hydrocarbyloxy group (preferably a lower alkoxy group) and the like], to be specific, $(CH_3)_2Ge$, $(C_6H_5)_2Ge$, $(CH_3)$ P, $(C_6H_5)$ P, $(C_4H_9)$ N, $(C_6H_5)N$, $(CH_3)B$, $(C_4H_9)B$, $(C_6H_5)B$, $(C_6H_5)Al$ and $(CH_3O)Al$.

Among them, the alkylene groups and the silylene groups are preferred.

$E^2$ and $E^3$ may be the same as or different from each other.

$M^2$ represents a transition metal of the IV to VI group in the periodic table, and to be specific, titanium, zirconium, hafnium, niobium, molybdenum and tungsten can be given. Among them, titanium, zirconium and hafnium are preferred, and zirconium is particularly suited.

$X^2$ and $Y^2$ each are covalent bonding ligands, and to be specific, they represent a hydrogen atom, a halogen atom, a hydrocarbon group having 1 to 20 carbon atoms, preferably 1 to 10 carbon atoms, an alkoxy group having 1 to 20 carbon atoms, preferably 1 to 10 carbon atoms, an amino group, a phosphorus-containing hydrocarbon group having 1 to 20 carbon atoms, preferably 1 to 12 carbon atoms (for example, a diphenylphosphine group and the like), a silicon-containing hydrocarbon group having 1 to 20 carbon atoms, preferably 1 to 12 carbon atoms (for example, a trimethylsilyl group and the like), a hydrocarbon group having 1 to 20 carbon atoms, preferably 1 to 12 carbon atoms or a halogen-containing boron compound (for example, $BF_4$ and $B(C_6H_5)_4$).

Among them, the halogen atom and the hydrocarbon group are preferred.

The above $X^2$ and $Y^2$ may be the same as or different from each other.

The specific examples of the transition metal compound represented by general formula (II) include (1,2'-ethylene)(2,1'-ethylene)-bis(3-trimethylsilylcyclopentadienyl)titanium dichloride, (1,2'-dimethylsilylene)(2,1'-dimethylsilylene)-bis(3-trimethylsilylcyclopentadienyl)titanium dichloride, (1,2'-ethylene)(2,1'-ethylene)-bis(3-trimethylsilyl-4-methylcyclopentadienyl)titanium dichloride and (1,2'-dimethylsilylene)(2,1'-dimethylsilylene)-bis(3-trimethylsilyl-4-methylcyclopentadienyl)titanium dichloride.

The specific examples further include compounds obtained by substituting a chlorine atom of the above compounds with a bromine atom, an iodine atom, methyl or phenyl and compounds obtained by substituting titanium which is a central metal in the transition metal compounds described above with zirconium, hafnium, niobium and tungsten.

The specific examples of the transition metal compound represented by general formula (III) include (1,2'-ethylene)(2,1'-ethylene)-bis(3-methylindenyl)titanium dichloride, (1,2'-ethylene)(2,1'-ethylene)-bis(3-methyl-4-isopropylidenyl)titanium dichloride, (1,2'-ethylene)(2,1'-ethylene)-bis(3-methyl-5,6-benzoindenyl)titanium dichloride, (1,2'-ethylene)(2,1'-isopropylidene)-bis(3-methyl-indenyl)titanium dichloride, (1,2'-methylene)(2,1'-ethylene)-bis(3-methyl-indenyl)titanium dichloride, (1,2'-methylene)(2,1'-isopropylidene)-bis(3-methyl-indenyl)titanium dichloride, (1,2'-dimethylsilylene)(2,1'-dimethylsilylene)-bis(3-methyl-indenyl)titanium dichloride, (1,2'-dimethylsilylene)(2,1'-dimethylsilylene)-bis(3-n-butylindenyl)titanium dichloride, (1,2'-dimethylsilylene)(2,1'-dimethylsilylene)-bis(3-i-propylindenyl)titanium dichloride, (1,2'-dimethylsilylene)(2,1'-dimethylsilylene)-bis(3-trimethylsilylmethylindenyl)titanium dichloride, (1,2'-dimethylsilylene)(2,1'-dimethylsilylene)-bis(3-phenylindenyl)titanium dichloride, (1,2'-dimethylsilylene)(2,1'-dimethylsilylene)-bis(3-methyl-4,5-benzoindenyl)titanium dichloride, (1,2'-dimethylsilylene)(2,1'-dimethylsilylene)-bis(3-methyl-4-isopropylindenyl)titanium dichloride, (1,2'-dimethylsilylene)(2,1'-dimethylsilylene)-bis(3,5,6-trimethylindenyl)titanium dichloride, (1,2'-dimethylsilylene)(2,1'-dimethylsilylene)-bis(3-methyl-4,7-di-i-propylindenyl)titanium dichloride, (1,2'-dimethylsilylene)(2,1'-dimethylsilylene)-bis(3-methyl-4-phenylindenyl)titanium dichloride, (1,2'-dimethylsilylene)(2,1'-dimethylsilylene)-bis(3-methyl-4-i-propylindenyl)titanium dichloride, (1,2'-dimethylsilylene)(2,1'-isopropylidene)-bis(3-methylindenyl)titanium dichloride, (1,2'-dimethylsilylene)(2,1'-isopropylidene)-bis(3-i-propylindenyl)titanium dichloride, (1,2'-dimethylsilylene)(2,1'-isopropylidene)-bis(3-n-butylindenyl)titanium dichloride, (1,2'-dimethylsilylene)(2,1'-isopropylidene)-bis(3-trimethylsilylmethylindenyl)titanium dichloride, (1,2'-dimethylsilylene)(2,1'-isopropylidene)-bis(3-trimethylsilylindenyl)titanium dichloride, (1,2'-dimethylsilylene)(2,1'-isopropylidene)-bis(3-phenylindenyl)titanium dichloride, (1,2'-dimethylsilylene)(2,1'-methylene)-bis(3-methylindenyl)titanium dichloride, (1,2'-dimethylsilylene)(2,1'-methylene)-bis(3-i-propylindenyl)titanium dichloride, (1,2'-dimethylsilylene)(2,1'-methylene)-bis(3-n-butylindenyl) titanium dichloride, (1,2'-dimethylsilylene)(2,1'-methylene)-bis(3-trimethylsilylmethylindenyl)titanium dichloride, (1,2'-dimethylsilylene)(2,1'-methylene)-bis(3-trimethylsilylindenyl)titanium dichloride, (1,2'-diphenylsilylene)(2,1'-methylene)-bis(3-methylindenyl)titanium dichloride, (1,2'-diphenylsilylene)(2,1'-methylene)-bis(3-i-propylindenyl)titanium dichloride, (1,2'-diphenylsilylene) (2,1'-methylene)-bis(3-n-butylindenyl)titanium dichloride, (1,2'-diphenylsilylene)(2,1'-methylene)-bis(3-trimethylsilylmethylindenyl)titanium dichloride and (1,2'-diphenylsilylene)(2,1'-methylene)-bis(3-trimethylsilylindenyl)titanium dichloride.

The specific examples further include compounds obtained by substituting a chlorine atom of the above compounds with a bromine atom, an iodine atom, methyl or phenyl and compounds obtained by substituting titanium which is a central metal in the transition metal compounds described above with zirconium, hafnium, niobium and tungsten.

A mixing ratio (mole ratio) of the metallocene catalyst preparing high crystalline polypropylene to the metallocene catalyst preparing low crystalline polypropylene is 1/1000 to 1000/1, preferably 1/1000 to 100/1 and more preferably 1/1000 to 10/1.

When it falls within the above range, the propylene-ethylene block copolymer having a satisfactory softness can be obtained.

Next, any compounds can be used as a catalyst component compound (4-1) out of the catalyst component compounds (4) as long as they are compounds which can be reacted with the transition metal compounds of the catalyst component (1) and the catalyst component (2) to form ionic complexes, and compounds represented by the following general formula (IV) or (V) can suitably be used:

 (IV)

 (V)

(provided that $L^2$ is $M^3$, $R^{22}R^{23}M^4$, $R^{24}{}_3C$ or $R^{25}M^5$)

In general formulae (IV) and (V), $L^1$ represents a Lewis base, $[Z]^-$ is non-coordinate anions $[Z^1]^-$ and $[Z^2]^-$, wherein $[Z^1]^-$ represents an anion in which plural groups are bonded to an element, that is, $[M^3G^1G^2 \ldots G^f]^-$ (wherein $M^3$ represents the 5th to 15th group element, preferably the 13th to 15th group element in the periodic table; $G^1$ to $G^f$ each represent a hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organic metaloid group or a hetero atom-containing hydrocarbon group having 2 to 20 carbon atoms; two or more groups out of $G^1$ to $G^f$ may form a ring; and f represents an integer of [(a valence of central metal $M^3$)+1]);

$[Z^2]^-$ represents a conjugate base of a Brönsted acid alone in which a logarithm (pKa) of an inverse number of an acid dissociation constant is −10 or less or a combination of a Brönsted acid and a Lewis acid or a conjugate base of an acid which is usually defined as a superstrong acid; and a Lewis base may be coordinated therewith;

$R^{21}$ represents a hydrogen atom, an alkyl group having 1 to 20 carbon atoms, an aryl group having 6 to 20 carbon atoms, an alkylaryl group or an arylalkyl group; $R^{22}$ and $R^{23}$ each represent a cyclopentadienyl group, a substituted cyclopentadienyl group, an indenyl group or a fluorenyl group; and $R^{24}$ represents an alkyl group having 1 to 20 carbon atoms, an aryl group, an alkylaryl group or an arylalkyl group;

$R^{25}$ represents a macrocyclic ligand such as tetraphenylporphyrin and phthalocyanine;

k is an integer of 1 to 3 in terms of an ionic valence of $[L^1-R^{21}]$ and $[L^2]$; a is an integer of 1 or more; and b=(k×a);

$M^4$ represents the 1st to 3rd, 11th to 13th and 17th group element in the periodic table, and $M^5$ represents the 7th to 12th group element in the periodic table.

Specific examples of $L^1$ include ammonia, amines such as methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline and p-nitro-N,N-dimethylaniline, phosphines such as triethylphosphine, triphenylphosphine and diphenylphosphine, thioethers such as tetrahydrothiophene, esters such as ethyl benzoate and nitriles such as acetonitrile and benzonitrile.

Specific examples of $R^{21}$ include hydrogen, methyl, ethyl, benzyl and triethyl; and the specific examples of $R^{22}$ and $R^{23}$ include cyclopentadienyl, methylcyclopentadienyl, ethylcyclopentadienyl and pentamethylcyclopentadienyl.

Specific examples of $R^{24}$ include phenyl, p-tolyl and p-methoxyphenyl; and specific examples of $R^{25}$ include tetraphenylporphin, phthalocyanine, allyl and methallyl.

Also, specific examples of $M^4$ include Li, Na, K, Ag, Cu, Br, I and $I_3$; and specific examples of $M^5$ include Mn, Fe, Co, Ni and Zn.

The specific examples of $M^3$ in $[Z^1]^-$, that is, $[M^3G^1G^2 \ldots G^f]$ include B, Al, Si, P, As and Sb, preferably B and Al.

The specific examples of $G^1$, $G^2$, ... $G^f$ include a dialkylamino group such as dimethylamino and diethylamino, an alkoxy group or an aryloxy group such as methoxy, ethoxy, n-butoxy and phenoxy, a hydrocarbon group such as methyl, ethyl, n-propyl, isopropyl, n-butyl, isobutyl, n-octyl, n-eicosyl, phenyl, p-tolyl, benzyl, 4-t-butylphenyl and 3,5-dimethylphenyl, a halogen atom such as fluorine, chlorine, bromine and iodine, a hetero atom-containing hydrocarbon group such as p-fluorophenyl, 3,5-difluorophenyl, pentachlorophenyl, 3,4,5-trifluorophenyl, pentafluorophenyl, 3,5-bis(trifluoromethyl)phenyl and bis (trimethylsilyl)methyl and an organic metaloid group such as pentamethylantimony, trimethylsilyl, trimethylgermyl, diphenylarsine, dicyclohexylantimony and diphenylboron.

Specific examples of the non-coordinate anions, that is, a Brönsted acid alone in which pKa is −10 or less or the conjugate base $[Z^2-$ of a combination of a Brönsted acid and a Lewis acid include a trifluoromethanesulfonic acid anion $(CF_3SO_3)^-$, a bis(trifluoromethanesulfonyl)methyl anion, a bis(trifluoromethanesulfonyl)benzyl anion, a bis(trifluoromethanesulfonyl)amide, a perchloric acid anion $(ClO_4)^-$, a trifluoroacetic acid anion $(CF_3CO_2)^-$, a hexafluoroantimony anion $(SbF_6)^-$, a fluorosulfonic acid anion $(FSO_3)^-$, a chlorosulfonic acid anion $(ClSO_3)^-$, a fluorosulfonic acid anion/antimony pentafluoride $(FSO_3/SbF_5)^-$, a fluorosulfonic acid anion/arsenic pentafluoride $(FSO_3/AsF_5)^-$ and trifluoromethanesulfonic acid/antimony pentafluoride $(CF_3SO_3/SbF_5)$.

Specific examples of the ionic compounds which are reacted with the transition metal compounds of the catalyst component (1) and the catalyst component (2) to form ionic complexes, that is, the catalyst component compounds (4-1) include triethylammonium tetraphenylborate, tri-n-buthylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)-borate, tetraethylammonium tetrakis-(pentafluorophenyl)borate, benzyl(tri-n-butyl)ammonium tetrakis(pentafluorophenyl)borate, methyldiphenylammonium tetrakis(pentafluorophenyl)-borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl (2-cyanopyridinium) tetrakis-(pentafluorophenyl)borate, methyl(4-cyanopyridinium) tetrakis(pentafluorophenyl)borate, triphenylphosphonium tetrakis(pentafluorophenyl)borate, dimethylanilinium tetrakisbis[(3,5-ditrifluoromethyl) phenyl]borate, ferrocenium tetraphenylborate, silver tetraphenylborate, triethyl tetraphenylborate, tetraphenylporphyrinmanganese tetraphenylborate, ferrocenium tetrakis(pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis (pentafluorophenyl)borate, tetraphenylporphyrinmanganese tetrakis(pentafluorophenyl)borate, silver tetrafluoroborate, silver hexafluorophosphate, silver hexafluoroarsenate, silver perchlorate, silver trifluoroacetate and silver trifluoromethanesulfonate.

The component compounds (4-1) may be used alone or in combination of two or more kinds thereof.

On the other hand, examples of aluminoxane of the component compound (4-2) include linear aluminoxane represented by general formula (VI):

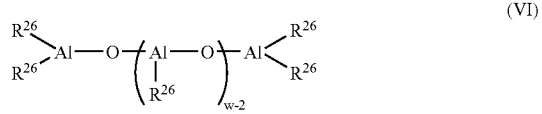

wherein $R^{26}$ represents a hydrocarbon group such as an alkyl group having 1 to 20 carbon atoms, preferably 1 to 12 carbon atoms, an alkenyl group, an aryl group and an arylalkyl group or a halogen atom; w represents an average polymerization degree and is usually an integer of 2 to 50, preferably 2 to 40; and respective $R^{26}$'s may be the same or different; and cyclic aluminoxane represented by general formula (VII):

wherein $R^{26}$ and w are the same as those in the general formula (VI) described above).

A process for producing the aluminoxanes described above includes a process in which alkylaluminum is brought into contact with a condensing agent such as water, but a means thereof shall not specifically be restricted, and they may be reacted according to publicly known processes.

It includes, for example, (i) a process in which an organic aluminum compound is dissolved in an organic solvent and in which this is brought into contact with water, (ii) a process in which an organic aluminum compound is first added in polymerization and in which water is then added thereto, (iii) a process in which an organic aluminum compound is reacted with crystal water contained in a metal salt or water adsorbed on an inorganic matter and an organic matter and (iv) a process in which tetraalkyldialuminoxane is reacted with trialkylaluminum and further reacted with water. Aluminoxanes may be insoluble in toluene.

The above aluminoxanes may be used alone or in combination of two or more kinds thereof.

A use proportion of a total amount of the catalyst component (1) and the catalyst component (2) to the catalyst component compound (4) falls within a range of preferably from 10:1 to 1:100, more preferably from 2:1 to 1:10 in terms of a mole ratio when the catalyst component compound (4-1) is used for the catalyst component compound (4), and when it falls within the range described above, the catalyst cost per a unit mass of the polymer is low and practical.

When the catalyst component compound (4-2) is used, it falls within a range of preferably from 1:1 to 1:1000000, more preferably from 1:10 to 1:10000 in terms of a mole ratio.

When it falls within the ranges described above, the catalyst cost per a unit mass of the polymer is low and practical.

Also, the catalyst component compound (4-2) and the catalyst component compound (4-1) can be used alone or in combination of two or more kinds thereof for the catalyst component compound (4).

Further, an organic aluminum compound as a catalyst component compound (5) in addition to the catalyst component (1), the catalyst component (2) and the catalyst component compound (4) each described above can be used for the polymerization catalyst in producing the propylene-ethylene block copolymer.

In this case, a compound represented by general formula (VIII) can be used as the organic aluminum compound of the catalyst component compound (5):

wherein $R^{27}$ represents an alkyl group having 1 to 10 carbon atoms; J represents a hydrogen atom, an alkoxy group having 1 to 20 carbon atoms, an aryl group having 6 to 20 carbon atoms or a halogen atom; and v represents an integer of 1 to 3.

The specific examples of the compound represented by general formula (VIII) described above include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminum sesquichloride.

The above organic aluminum compounds may be used alone or in a combination of two or more kinds thereof.

In the process for producing the propylene-ethylene block copolymer, preliminary contact can be carried out as well using the catalyst component (1)+the catalyst component (2), the catalyst component compound (4) and the catalyst component compound (5) each described above.

The preliminary contact can be carried out by bringing the catalyst component (1)+the catalyst component (2) into contact with, for example, the catalyst component compound (4), but the method therefor shall not specifically be restricted, and publicly known methods can be used.

The above preliminary contact is effective for reducing the catalyst cost such as a raise in the catalyst activity and a reduction in a use proportion of the catalyst component compound (4) which is a promoter.

The preliminary contact temperature is usually −20° C. to 200° C., preferably −10° C. to 150° C. and more preferably 0° C. to 80° C.

In the preliminary contact, aliphatic hydrocarbons and aromatic hydrocarbons can be used as a solvent of inert hydrocarbon.

Among them, the aliphatic hydrocarbons are particularly preferred.

A use proportion of a total amount of the catalyst component (1) and the catalyst component (2) to the catalyst component compound (5) each described above falls within a range of preferably from 1:1 to 1:10000, more preferably from 1:5 to 1:2000 and further preferably from 1:10 to 1:1000 in terms of a mole ratio.

Use of the catalyst component compound (5) makes it possible to elevate the polymerization activity per transition metal, but too much amount thereof not only wastes the organic aluminum compound but also it remains in the polymer in a large amount, and therefore it is not preferred.

The porous carrier includes, to be specific, $SiO_2$, $Al_2O_3$, MgO, $ZrO_2$, $TiO_2$, $Fe_2O_3$, $B_2O_3$, CaO, ZnO, BaO, $ThO_2$ and mixtures thereof, for example, silica alumina, zeolite, ferrite and glass fiber.

Among them, $SiO_2$ and $Al_2O_3$ are particularly preferred.

The porous carriers described above may contain a small amount of carbonates, nitrates and sulfates.

On the other hand, magnesium compounds represented by $MgR^{28}{}_x X^1{}_y$ such as $MgCl_2$ and $Mg(OC_2H_5)_2$ and complex salts thereof can be given as carriers other than those described above.

In this case, $R^{28}$ represents an alkyl group having 1 to 20 carbon atoms, an alkoxy group having 1 to 20 carbon atoms or an aryl group having 6 to 20 carbon atoms; $X^1$ represents a halogen atom or an alkyl group having 1 to 20 carbon atoms; x is 0 to 2; y is 0 to 2, and x+y=2.

Respective $R^{28}$ and respective $X^1$ each may be the same or different.

Further, typical examples of organic carriers include polymers such as polystyrene, styrene-divinylbenzene copolymers, polyethylene, poly(1-butene), substituted polystyrene and polyallylate, starch and carbon.

$MgCl_2$, $MgCl(OC_2H_5)$, $Mg(OC_2H_5)_2$ and the like are further preferred as the carrier for the catalyst used for the production of the propylene-ethylene block copolymer.

The properties of the carrier are varied depending on the kind thereof and the production process, and the average particle diameter is usually 1 to 300 μm, preferably 10 to 200 μm and more preferably 20 to 100 μm.

When the particle diameter is small, fine powders contained in the polymer are increased, and when the particle diameter is large, coarse particles contained in the polymer are increased and cause a reduction in the bulk density and clogging of a hopper.

The carrier has a specific surface area of usually 1 to 1000 $m^2/g$, preferably 50 to 500 $m^2/g$ and a pore volume of usually 0.1 to 5 $cm^3/g$, preferably 0.3 to 3 $cm^3/g$.

When the specific surface area or the pore volume falls in the range described above, the catalyst activity is elevated.

The specific surface area and the pore volume can be determined from a volume of adsorbed nitrogen gas according to, for example, a BET method.

Further, when the carrier described above is an inorganic oxide carrier, it is preferably used after burned usually at 150 to 1000° C., preferably 200 to 800° C.

When at least one of the catalyst components is carried on the carrier described above, at least one of the catalyst component (1)+the catalyst component (2) and the catalyst component compound (4), preferably both of the catalyst component (1)+the catalyst component (2) and the catalyst component compound (4) are preferably carried thereon.

A method for carrying at least one of the catalyst component (1)+the catalyst component (2) and the catalyst component compound (4) on the above carrier shall not specifically be restricted, and capable being used are, for example, (i) a method in which at least one of the catalyst component (1)+the catalyst component (2) and the catalyst component compound (4) is mixed with the carrier, (ii) a method in which the carrier is treated with an organic aluminum compound or a halogen-containing silicon compound and in which it is then mixed with at least one of the catalyst component (1)+the catalyst component (2) and the catalyst component compound (4) in an inert solvent, (iii) a method in which the carrier and the catalyst component (1)+the catalyst component (2) and/or the catalyst component compound (4) are reacted with an organic aluminum compound or a halogen-containing silicon compound, (iv) a method in which the catalyst component (1)+the catalyst component (2) or the catalyst component compound (4) is carried on the carrier and in which it is then mixed with the catalyst component compound (4) or the catalyst component (1)+the catalyst component (2), (v) a method in which a contact reaction product of the catalyst component (1)+the catalyst component (2) and the catalyst component compound (4) is mixed with the carrier and (vi) a method in which the carrier is allowed to be coexistent in the contact reaction of the catalyst component (1)+the catalyst component (2) with the catalyst component compound (4).

In the methods (iv), (v) and (vi) described above, the organic aluminum compound of the catalyst component compound (5) can be added as well.

In the production of the catalyst used for producing the propylene-ethylene block copolymer, the catalyst may be prepared by irradiating with an elastic wave in bringing the catalyst component (1)+the catalyst component (2), the catalyst component compound (4) and the catalyst component compound (5) each described above into contact.

The elastic wave includes usually an elastic wave, particularly preferably a supersonic wave.

To be specific, it includes a supersonic wave having a frequency of 1 to 1000 kHz, preferably 10 to 500 kHz.

The catalyst thus obtained may be used for polymerization after once distilling off the solvent and taking out the catalyst in the form of a solid matter, or it may be used as it is.

In the production of the propylene-ethylene block copolymer, the catalyst can be produced by carrying out an operation of carrying at least one of the catalyst component (1)+the catalyst component (2) and the catalyst component compound (4) on the carrier in the polymerization system.

Capable of being used is, for example, a method in which at least one of the catalyst component (1)+the catalyst component (2) and the catalyst component compound (4) and the carrier and, if necessary, the organic aluminum compound of the catalyst component compound (5) described above are added and in which olefin such as ethylene is added at an atmospheric pressure to 2 MPa to carry out preliminary polymerization at −20 to 200° C. for one minute to 2 hours to thereby form the catalyst particles.

A use proportion of the catalyst component compound (4-1) to the carrier in the catalyst used for producing the propylene-ethylene block copolymer is preferably 1:5 to 1:10000, more preferably 1 10 to 1:500 in terms of a mass ratio, and a use proportion of the component compound (4-2) to the carrier is preferably 1:0.5 to 1:1000, more preferably 1:1 to 1:50 in terms of a mass ratio.

When two or more kinds of the catalyst component compounds (4) are used in a mixture, a use proportion of the respective catalyst components (4) to the carrier fall within the range described above in terms of a mass ratio.

Further, a use proportion of the catalyst component (1)+ the catalyst component (2) to the carrier is preferably 1:5 to 1:10000, more preferably 1:10 to 1:500 in terms of a mass ratio.

When a use proportion of the component compound (4) [the component compound (4-1) or the component compound (4-2)] to the carrier or a use proportion of the catalyst component (1)+the catalyst component (2) to the carrier falls within the range described above, the activity is elevated, and the powder morphology is improved as well.

The catalyst for polymerization thus prepared has an average particle diameter of usually 2 to 200 µm, preferably 10 to 150 µm and particularly preferably 20 to 100 µm and a specific surface area of usually 20 to 1000 m²/g, preferably 50 to 500 m²/g.

When the average particle diameter is 2 µm or more, fine powders contained in the polymer are reduced, and when it is 200 µm or less, coarse particles contained in the polymer are favorably reduced.

When the specific surface area is 20 m²/g or more, the activity raises, and when it is 1000 m²/g or less, the polymer raises in a bulk density.

In the catalyst used for producing the propylene-ethylene block copolymer, an amount of the transition metal contained in 100 g of the carrier is usually 0.05 to 10 g, particularly preferably 0.1 to 2 g.

When an amount of the transition metal falls within the range described above, the activity is elevated.

The polymerization of propylene in the first step can be selected from slurry polymerization and bulk polymerization.

The copolymerization of propylene and ethylene in the second step can be selected from slurry polymerization, bulk polymerization and gas phase polymerization.

The first step and the second step can be carried out by multistage polymerization.

In respect to the polymerization conditions in the homopolymerization of propylene, the polymerization pressure thereof shall not specifically be restricted and is suitably selected in a range of usually an atmospheric pressure to 8 MPa, preferably 0.2 to 5 MPa, and the polymerization temperature is suitably selected in a range of usually 0 to 200° C., preferably 30 to 100° C.

The polymerization time is usually 5 minutes to 20 hours, preferably 10 minutes to 10 hours.

In respect to the polymerization conditions in the copolymer part, the polymerization pressure thereof shall not specifically be restricted and is suitably selected in a range of usually an atmospheric pressure to 8 MPa, preferably 0.2 to 5 MPa, and the polymerization temperature is suitably selected in a range of usually 0 to 200° C., preferably 20 to 100° C.

The polymerization time is usually one minute to 20 hours, preferably one minute to 10 hours.

A ratio of propylene to ethylene fed is 0.01 to 9, preferably 0.05 to 2.3 in terms of a mole ratio.

A molecular weight of the polymers in the propylene homopolymer part and the copolymer part can be controlled by adding a chain transfer agent, preferably adding hydrogen.

Further, inert gas such as nitrogen may be allowed to be present.

When using a polymerization solvent, capable of being used are aromatic hydrocarbons such as benzene, toluene, xylene and ethylbenzene, alicyclic hydrocarbons such as cyclopentane, cyclohexane and methylcyclohexane, aliphatic hydrocarbons such as pentane, hexane, heptane and octane and halogenated hydrocarbons such as chloroform and dichloromethane.

The above solvents may be used alone or in combination of two or more kinds thereof.

The polymerization can be carried out without using the solvent depending on the polymerizing method.

In the polymerization, preliminary polymerization can be carried out using the catalyst for polymerization described above.

The preliminary polymerization can be carried out by bringing the solid catalyst component into contact with a small amount of olefin, but a method thereof shall not specifically be restricted, and a publicly known method can be used.

The olefin used for the preliminary polymerization shall not specifically be restricted, and examples are the same ones as those described above including ethylene, α-olefins having 3 to 20 carbon atoms and a mixture thereof. Ethylene or propylene used in the above polymerization is advantageously used.

The preliminary polymerization temperature is usually −20 to 200° C., preferably −10 to 130° C. and more preferably 0 to 80° C.

In the preliminary polymerization, aliphatic hydrocarbons, aromatic hydrocarbons and the like can be used as a solvent.

Among them, the aliphatic hydrocarbons are particularly preferred.

The preliminary polymerization may be carried out without using the solvent.

In the preliminary polymerization, the conditions are preferably controlled so that a intrinsic viscosity [η] (measured in decalin at 135° C.) of the preliminary polymerization product is 0.2 dl/g or more, particularly 0.5 dl/g or more and an amount of the preliminary polymerization product per millimole of the transition metal component contained in the catalyst is 1 to 10000 g, particularly 10 to 1000 g.

A triad chain fraction $f_{EEE}$ of [EEE] as the propylene (P)-ethylene (E) block copolymer obtained by using the catalyst system of the present invention is 0.1 mole % or less, preferably 0.08 mole % or less and more preferably 0.05 mole % or less.

When it is 0.1 mole % or less, the transparency raises.

The triad chain fraction $f_{EEE}$ becomes larger when an Mg/Ti base catalyst is used, and therefore the catalyst system of the present invention has to be used in order to control it to 0.1 or less.

In the propylene-ethylene block copolymer obtained by using the catalyst system of the present invention, R1·R2 is 0.5 or more, preferably 1.0 or more and more preferably 1.1 or more, wherein R1 is a reactivity ratio of propylene, and R2 is a reactivity ratio of ethylene.

When it does not satisfy 0.5 or more, the heat resistance is unsatisfactory in a certain case.

Also, R1·R2 can be controlled by a proportion of the homopolymerization amount to the random copolymerization amount.

The ethylene content is 1.0 mole % or more, preferably 2.0 mole % or more, and if it is not satisfied, the softness is not satisfactory in a certain case.

Accordingly, R1·R2 can be controlled to 0.5 or more by controlling the homopolymerization amount to, for example, 5 mass % or more.

The $f_{EEE}$, R1·R2 and the ethylene content in the copolymer can be determined in the following manners.

In the propylene (P)-ethylene (E) block copolymer of the present invention, the following three chains can be calculated by the following equation according to the assignments of peaks in $^{13}$C-NMR proposed in "Macromolecules, 8, 697 (1975)" by A. Zambelli et al.:

$EPE = I_8$ $PPE = I_9 + (I_{10}/2) + I_{11}$ $EEE = (EEE/2) + (PEE/4) = (I_{12}/2) + (I_{13}/4)$ $PPP = I_{14} + (I_{10}/2)$ $PEE = I_{15}$ $PEP = I_{16} + (I_{17} + I_{18})/4$

In this case, $I_8$ is an intensity of 33.3 ppm; $I_9$ is an intensity of 31.1 ppm; $I_{10}$ is an intensity of 31.2 ppm; $I_{11}$ is an intensity of 34.1 ppm; $I_{12}$ is an intensity of 30.0 ppm; $I_{13}$ is an intensity of 30.4 ppm; $I_{14}$ is an intensity of 29.2 ppm; $I_{15}$ is an intensity of 27.3 ppm; $I_{16}$ is an intensity of 24.7 ppm; $I_{17}$ is an intensity of 34.9 ppm; and $I_{18}$ is an intensity of 34.6 ppm;

Based on T=EPE+PPE+EEE+PPP+PEE+PEP, the respective triad chain fractions (mole %) can be calculated according to the following equations:

$f_{EPE} = (EPE/T) \times 100$ $f_{PPE} = (PPE/T) \times 100$ $f_{EEE} = (EEE/T) \times 100$ $f_{PPP} = (PPP/T) \times 100$ $f_{PEE} = (PEE/T) \times 100$ $f_{PEP} = (PEP/T) \times 100$ The dyad chain fractions can be calculated from the triad chain fractions described above according to the following equations:

$f_{PP} = F_{PPP} + [f_{PPE}/2]$ $f_{PE} = f_{EPE} + f_{PEP} + [(f_{PPE} + f_{PEE})/2]$ $f_{EE} = f_{EEE} + [f_{PEE}/2]$

Also, R1·R2 (product of the reactivity ratios of propylene and ethylene) can be calculated from the dyad chain fraction according to the following equation:

$R1 \cdot R2 = (4 f_{EE} \cdot f_{PP}) / (f_{EP} \cdot f_{EP})$

Further, the ethylene content (mole %) can be calculated according to the following equation:

ethylene content (mole %) = $f_{EE} + (f_{PE}/2)$

[Measurement of $^{13}$C-NMR]

A sample 220 mg is taken in an NMR sample tube having a diameter of 10 mm, and 3 mL of a 1,2,4-trichlorobenzene/heavy benzene (90/10 volume %) mixed solvent is added thereto.

The sample is homogeneously dissolved at 140° C. by means of an aluminum block heater, and then the $^{13}$C-NMR spectrum is measured.

The following are the NMR measuring conditions:
NMR apparatus: EX4000 (400 MHz NMR apparatus) produced by JEOL. Ltd.
Pulse width: 7.5 μs (45 degree pulse)
Pulse interval: 4 seconds
Integration: 1,000 times
Measuring temperature: 130° C.

The propylene-ethylene block copolymer obtained by using the catalyst system of the present invention has a intrinsic viscosity [η] of 1.0 dl/g or more, preferably 1.5 dl/g or more and further preferably 1.7 dl/g or more.

When the intrinsic viscosity [η] is less than 1.0 dl/g, a blocking property of the copolymer powder is not satisfactory in a certain case.

The intrinsic viscosity [η] can be controlled to 1.0 dl/g or more by, for example, reducing an amount of hydrogen used in the polymerization.

An intrinsic viscosity [η] of a xylene-soluble fraction in the propylene-ethylene block copolymer obtained by using the catalyst system of the present invention is 1.0 dl/g or more, preferably 1.5 dl/g or more and further preferably 2.0 dl/g or more.

When the intrinsic viscosity [η] of the xylene-soluble fraction is less than 1.0 dl/g, a blocking property of the copolymer powder is not satisfactory in a certain case.

The intrinsic viscosity [η] of the xylene-soluble fraction can be controlled to 1.0 dl/g or more by, for example, reducing an amount of hydrogen used in the polymerization.

The xylene-soluble fraction in the propylene-ethylene block copolymer is measured by the following method.

The sample 5±0.05 g is precisely weighed and put into a 1000 milliliter eggplant type flask. Further, 1±0.05 g of BHT (antioxidant) is added thereto, and then a rotator and par-axylene 700±10 milliliter are put therein.

Then, the eggplant type flask is equipped with a condenser and heated on an oil bath of 140±5° C. for 120±30 minutes while operating the rotator to dissolve the sample in paraxylene.

Next, the content in the flask is poured into a 1000 milliliter beaker, and then the solution in the beaker is left (8 hours or longer) cooling down to a room temperature (25° C.) while stirring by means of the rotator, followed by filtering the deposit by means of wire gauze.

The filtrate is further filtered through a filter paper, and the filtrate thereof is poured into 2000±100 milliliter of methanol put in a 3000 milliliter beaker and left standing for 2 hours or longer while stirring at a room temperature (25° C.) by means of the rotator.

Next, the deposit is filtered by means of the wire gauze and air-dried for 5 hours or longer, and then it is dried in a vacuum dryer at 100±5° C. for 240 to 270 minutes to recover a xylene-soluble component.

The intrinsic viscosity [η] is measured in the following manner.

[Measurement of Intrinsic Viscosity [η]]:

It was measured in decalin at a temperature of 135° C. by means of a VMR-053 type automatic viscometer manufactured by Rigo Co., Ltd.

In the propylene-ethylene block copolymer obtained by using the catalyst system of the present invention, an eluting component at 0° C. in Temperature rise fraction chromatograph (TREF) accounts for 50% by weight or less, preferably 40% by weight or less and more preferably 35% by weight or less.

When the eluting component at 0° C. exceeds 50% by weight, a blocking property of the copolymer powder is not satisfactory.

The Temperature rise fraction chromatograph was measured in the following manner.

[Measurement of Temperature Rise Fraction Chromatograph]

A solution prepared by completely dissolving the sample in orthodichlorobenzene at the temperature of 140° C. was introduced into a Temperature rise fraction chromatograph (TREF) column which was controlled at a temperature of 135° C., and then it was gradually cooled down to 0° C. at a rate of 5° C./hr to allow the sample to be adsorbed on a filler.

After maintained the temperature at 0° C. for 30 minutes, orthodichlorobenzene was allowed to flow through the column and maintained at the temperature of 0° C. for 10 minutes to elute a component which was not adsorbed on the filler.

Then, the temperature was elevated up to 135° C. at a rate of 40° C./hr while allowing orthodichlorobenzene to flow to elute in order the polymer components.

In this case, an elution curve was obtained by measuring the concentrations of the eluted components.

(Measuring Apparatus)
TREF column: stainless column (4.6 mmφ×150 mm) produced by GL Science Co., Ltd.
Flow cell: KBr cell, optical path=1 mm, produced by GL Science Co., Ltd.
Liquid pump: SSC-3100, produced by Senshu Science Co., Ltd.
Valve oven: MODEL 554, produced by GL Science Co., Ltd.
TREF oven: produced by GL Science Co., Ltd. Two series temperature controller: REX-C100, produced by Rigaku Kogyo Co., Ltd.

Concentration detector:
Infrared detector for liquid chromatography,
MIRAN 1A CVF, produced by FOXBORO Co., Ltd.

(Measuring Conditions)
Solvent: orthodichlorobenzene
Sample concentration: 7.5 g/liter
Injection amount: 500 μliter
Flow rate: 2.0 milliliter/minute
Column filler: Chromosorve P (30/60 mesh)

The propylene-ethylene block copolymer obtained by using the catalyst system of the present invention has an elastic modulus E of less than 330 (MPa) and an internal haze H of less than 55(%).

The higher the use proportion of (the metallocene catalyst preparing low crystalline polypropylene)/(the metallocene catalyst preparing high crystalline polypropylene) is and the more the use amount of ethylene is, the more the soft propylene-ethylene block copolymer is obtained.

Use of the metallocene catalysts makes it possible to control the haze to less than 55%.

The propylene-ethylene block copolymer (powder) obtained by using the catalyst system of the present invention is preferably controlled to a suited molecular weight by using a decomposing agent such as peroxides and used for desired uses (injection and films).

Various additives may be added, if necessary, to the propylene-ethylene block copolymer obtained by using the catalyst system of the present invention.

Various additives used if necessary include antioxidants, neutralizing agents, slipping agents, anti-blocking agents, anticlouding agents and anti-static agents.

These additives may be used alone or in combination of two or more kinds thereof.

The antioxidants include, for example, phosphorus base antioxidants, phenol base antioxidants and sulfurs base antioxidants.

The specific examples of the phosphorus base antioxidants include trisnonylphenyl phosphite, tris(2,4-di-t-butylphenyl) phosphite, distearypentaerythritol diphosphite, bis(2,4-di-t-butylphenyl)pentaerythritol phosphite, bis(2,6-di-t-butyl-4-methylphenyl)pentaerythritol phosphite, 2,2-methylenebis(4,6-di-t-butylphenyl)octyl phosphite,tetrakis (2,4-di-t-butylphenyl)-4,4-biphenylene-di-phosphite, Adekastab 1178 (available from Asahi Denka Co., Ltd.), Sumilizer TNP (available from Sumitomo Chemical Co., Ltd.), JP-135 (available from Johoku Chemical Co., Ltd.), Adekastab 2112 (available from Asahi Denka Co., Ltd.), JPP-2000 (available from Johoku Chemical Co., Ltd.), Weston 618 (available from GE Company), Adekastab PEP-24G (available from Asahi Denka Co., Ltd.), Adekastab PEP-36 (available from Asahi Denka Co., Ltd.), Adekastab HP-10 (available from Asahi Denka Co., Ltd.), Sandstab P-EPQ (available from Sand Co., Ltd.) and Phosphite 168 (available from Ciba Specialty Chemicals Co., Ltd.).

The specific examples of the phenol base antioxidants include 2,6-di-t-butyl-4-methylphenol, n-octadecyl-3-(3',5'-di-t-butyl-4'-hydroxyphenyl) propionate, tetrakis methylene-3-(3,5-di-t-butyl-4-hydroxyphenyl)propionate]methane, tris(3,5-di-t-butyl-4-hydroxybenzyl) isocyanurate, 4,4'-butylidenebis-(3-methyl-6-t-butylphenol), triethylene glycol-bis[3-(3-t-butyl-4-hydroxy-5-methylphenyl) propionate], 3,9-bis{2-[3-(3-t-butyl-4-hydroxy-5-methylphenyl) prdpionyloxy]-1,1-dimethylethyl}-2,4,8,10-tetraoxaspiro[5, 5]undecane, Sumilizer BHT (available from Sumitomo Chemical Co., Ltd.), Yoshinox BHT (available from Yoshitomi Seiyaku Co., Ltd.), Antage BHT (available from Kawaguchi Chemical Ind. Co., Ltd.), Irganox 1076 (available from Ciba Specialty Chemicals Co., Ltd.), Irganox 1010 (available from Ciba Specialty Chemicals Co., Ltd.), Adekastab AO-60 (available from Asahi Denka Co., Ltd.), Sumilizer BP-101 (available from Sumitomo Chemical Co., Ltd.), Tominox TT (available from Yoshitomi Seiyaku Co., Ltd.), TTHP (available from Toray Corporation), Irganox 3114 (available from Ciba Specialty Chemicals Co., Ltd.), Adekastab AO-20 (available from Asahi Denka Co., Ltd.), Adekastab AO-40 (available from Asahi Denka Co., Ltd.), Sumilizer BBM-S (available from Sumitomo Chemical Co., Ltd.), Yoshinox BB (available from Yoshitomi Seiyaku Co., Ltd.), Antage W-300 (available from Kawaguchi Chemical Ind. Co., Ltd.), Irganox 245 (available from Ciba Specialty Chemicals Co., Ltd.), Adekastab AO-70 (available from Asahi Denka Co., Ltd.), Tominox 917 (available from Yoshitomi Seiyaku Co., Ltd.), Adekastab AO-80 (available from Asahi Denka Co., Ltd.) and Sumilizer GA-80 (available from Sumitomo Chemical Co., Ltd.).

The specific examples of the sulfur base antioxidants include dilauryl-3,3'-thiodipropionate, dimyristyl-3,3'-thiodipropionate, distearyl-3,3'-thiodipropionate, pentaerythritoltetrakis(3-laurylthiopropionate), Sumilizer TPL (available from Sumitomo Chemical Co., Ltd.), Yoshinox DLTP (available from Yoshitomi Seiyaku Co., Ltd.), Antiox L (available from NOF Corp.), Sumilizer TPM (available from Sumitomo Chemical Co., Ltd.), Yoshinox DMTP (available from Yoshitomi Seiyaku Co., Ltd.), Antiox M (available from NOF Corp.), Sumilizer TPS (available from Sumitomo Chemical Co., Ltd.), Yoshinox DSTP (available from Yoshitomi Seiyaku Co., Ltd.), Antiox S (available from NOF Corp.), Adekastab AO-412S (available from Asahi Denka Co., Ltd.), SEENOX 412S (available from SHIPRO KASEI KAISHA Ltd.) and Sumilizer TDP (available from Sumitomo Chemical Co., Ltd.).

Particularly preferred as the antioxidants used when the propylene-ethylene block copolymer obtained by using the catalyst system of the present invention is used for film and sheet uses are Irganox 1010: material name: pentaerythritoltetrakis[3-(3,5-di-t-butyl-4-hydroxyphenyl) propionate], Irgafos 168: chemical name: tris(2,4-di-t-butylphenyl) phosphite, Irganox 1076: material name: octadecyl-3-(3,5-di-t-butyl-4-hydroxyphenyl) propionate, Irganox 1330: material name: 1,3,5-trimethyl-2,4,6-tris(3,5-di-t-butyl-4-hydroxybenzyl)benzene, Irganox 3114: material name: tris(3,5-di-t-butyl-4-hydroxybenzyl) isocyanurate and P-EPQ: material name: tetrakis(2,4-di-t-butylphenyl)-4,4-biphenylene-diphosphite.

When the antioxidant is used in the present invention, 0.001 to 1 mass part of the antioxidant is added to 100 parts by weight of the propylene-ethylene block copolymer.

This makes it possible to prevent yellowing and therefore is preferred.

The specific use examples of the antioxidants described above include:

| Use Example 1: | Irganox 1010 | 1000 ppm |
| --- | --- | --- |
| | PEP-Q | 1000 ppm |
| Use Example 2: | Irganox 1076 | 1200 ppm |
| | PEP-Q | 600 ppm |
| | Irgafos 168 | 800 ppm |
| Use Example 3: | Irganox 1010 | 400 to 1000 ppm |
| | Irgafos 168 | 750 to 1500 ppm |

Calcium stearate, zinc stearate, magnesium stearate and hydrotalcite (DHT-4A): composition formula: $Mg_{4.5}Al_2(OH)_{13}CO_3.3.5H_2O$ are particularly preferred as the neutralizing agents for uses of a film and a sheet.

"Sylysia": synthetic silica series available from by Fuji Sylysia Chemical Ltd.) and "MIZUKASIL": synthetic silica series manufactured by Mizusawa Industrial Chemicals, Ltd. are particularly preferred as the anti-blocking agents for uses of a film and a sheet.

Erucamide, oleamide, stearamide, behenamide, ethylenebisstearamide, ethylenebisoleamide, stearylerucamide and oleylpalmitamide are particularly preferred as the slipping agents for uses of a film and a sheet.

When the nucleus-forming agent is used in the present invention, an addition amount of the nucleus-forming agent falls within a range of from 10 ppm or more, preferably from 10 to 10000 ppm, more preferably from 10 to 5000 ppm and further preferably 10 to 2500 ppm based on the propylene-ethylene block copolymer.

When it is 10 ppm or more, the low temperature heat sealing property is improved. On the other hand, when it exceeds 10000 ppm, the cost is elevated.

The present invention shall more specifically be explained below with reference to examples, but the present invention shall by no means be restricted by these examples.

EXAMPLES

The propylene-ethylene block copolymer obtained by using the catalyst system of the present invention was measured for resin characteristics such as an ethylene content, $f_{EEE}$, R1·R2, its intrinsic viscosity [η] and an intrinsic viscosity [η] of a xylene-soluble fraction by the foregoing methods described in the specification.

A tensile elastic modulus of the propylene-ethylene block copolymer was measured in accordance with JIS K-7113 using a test piece prepared by pres-molding the propylene-ethylene block copolymer. Thickness of a test piece (No. 2 dumbbell): 1 mm Crosshead speed: 50 mm/minute Load cell: 100 kg An internal haze of the propylene-ethylene block copolymer was measured in accordance with JIS K-7105 using a test piece having a thickness of 1 mm which was prepared by press-molding the propylene-ethylene block copolymer and after applying silicon oil (KF65, available from Shin-Etsu Silicones Co. Ltd.) over a surface in order to remove scattering on the surface.

A transparency of the propylene-ethylene block copolymer was visually measured using the same test piece as described above.

In the evaluation criteria of the transparency, the copolymer having a good transparency was marked with A, and the copolymer having an inferior transparency was marked with C.

A morphology of the propylene-ethylene block copolymer was marked with C when lumps having a side of 5 cm or more emerged, marked with A when lumps having a side of 1 cm or more and less than 5 cm emerged and marked with AA when lumps having a side of less than 1 cm emerged.

Example 1

(1) Synthesis of (1,2'-dimethylsilylene)(2,1'-dimethylsilylene)-bis(3-trimethylsilylmethyl-indenyl)zirconium dichloride

(i) Synthesis of (1,2'-dimethylsilylene)(2,1'-dimethylsilylene)-bis(indene)

A 1 L three neck flask was charged with 100 mL of THF and 5.0 g (206 mmol) of Mg under nitrogen flow.

Next, 0.1 ml of 1,2-dibromoethane was added thereto and stirred to activate Mg.

After stirring for 30 minutes, the solvent was drawn out, and 100 mL of fresh THF was added thereto.

Further, 250 mL of a THF solution of 10.0 g (51.3 mmol) of 2-boromoindene was dropwise added thereto in 2 hours.

After finishing dropwise adding, the solution was stirred at a room temperature for 2 hours and then cooled down to −78° C., and a THF 100 mL solution of 6.2 mL (51.3 mmol) of dichlorodimethylsilane was dropwise added thereto in 1 hour.

After stirring for 15 hours, the solvent was distilled off, and the residue was extracted with 300 mL of hexane, followed by distilling the solvent off, whereby 9.6 g (46.2 mmol) of 2-chloromethylsilylindene was obtained. (yield: 90%)

Next, a 1 L three neck flask was charged with 400 mL of THF and 9.6 g of 2-chloromethylsilylindene under nitrogen flow and cooled down to −78° C., and then 46.2 mL (46.2 mmol) of a THF solution (1.0 M) of LiN(trimethylsilyl)$_2$ was dropwise added thereto.

After stirring at a room temperature for 15 hours, the solvent was distilled off, and the residue was extracted with 300 mL of hexane, followed by distilling the solvent off, whereby 2.5 g (7.2 mmol) of (1,2'-dimethylsilylene)(2,1'-dimethylsilylene)-bis(indene) was obtained. (yield: 31%)

Measured value of $^1$H-NMR (90 MHz, CDCl$_3$) δ: −0.69, 0.73 (12H, dimethylsilylene), 3.66 (4H, —CH$_2$—), 7.17 (8H, Ar—H)

(ii) Synthesis of (1,2'-dimethylsilylene)(2,1'-dimethylsilylene)-bis(3-trimethylsilylmethyl-indenyl)zirconium dichloride A Schlenk bottle was charged with 2.5 g (7.2 mmol) of (1,2'-dimethylsilylene)(2,1'-dimethylsilylene)-bis(indene) described above and 100 mL of ether.

The bottle was cooled down to −78° C. and charged with 9.0 ml (14.8 mmol) of n-BuLi (hexane solution 1.6 M), and then it was stirred at a room temperature for 12 hours.

The solvent was distilled off, and the resultant solid matter was washed with 20 mL of hexane, whereby the lithium salt was quantitatively obtained.

The lithium salt (6.97 mmol) of (1,2'-dimethylsilylene)(2,1'-dimethylsilylene)-bis(indene) was dissolved in 50 ml of THF in the Schlenk bottle, and the solution was cooled down to −78° C.

Next, 2.1 mL (14.2 mmol) of iodomethyltrimethylsilane was slowly dropwise added thereto and stirred at a room temperature for 12 hours.

The solvent was distilled off, and 50 mL of ether was added, followed by washing the solution with a saturated ammonium chloride solution.

After separating the liquid, the organic phase was dried, and the solvent was removed to obtain 3.04 g (5.9 mmol) of (1,2'-dimethylsilylene)(2,1'-dimethylsilylene)-bis(3-trimethylsilylmethylindene) was obtained. (yield: 84%)

The Schlenk bottle was charged with 3.04 g (5.9 mmol) of (1,2'-dimethylsilylene)(2,1'-dimethylsilylene)-bis(3-trimethylsilylmethylindene) described above and 50 mL of ether under nitrogen flow.

The bottle was cooled down to −78° C. and charged with 7.6 mL (11.8 mmol) of n-BuLi (hexane solution 1.54 M), and then it was stirred at a room temperature for 12 hours.

The solvent was distilled off, and the resultant solid matter was washed with 40 mL of hexane, whereby 3.06 g (5.1 mmol) of an ether adduct of the lithium salt was obtained. (yield: 86%)

Measured value of $^1$H-NMR (90 MHz, THF-d$_8$) δ: 0.04 (s, 18H, trimethylsilyl), 0.48 (s, 12H, dimethylsilylene), 1.10 (t, 6H, methyl), 2.59 (s, 4H, methylene), 6.2 to 7.7 (m, 8H, Ar—H)

The ether adduct of the lithium salt described above was dissolved in 50 mL of toluene under nitrogen flow.

The solution was cooled down to −78° C., and 20 mL of a toluene suspension of 1.2 g (5.1 mmol) of zirconium tetrachloride which was cooled in advance to −78° C. was dropwise added thereto.

After dropwise added, the solution was stirred at a room temperature for 6 hours, and the solvent of the reaction liquid was distilled off.

The resultant residue was recrystallized from dichloromethane to obtain 0.9 g (1.33 mmol) of (1,2'-dimethylsilylene)(2,1'-dimethylsilylene)-bis(3-trimethylsilylmethylindenyl)zirconium dichloride. (yield: 26%)

Measured value of $^1$H-NMR (90 MHz, CDCl$_3$) δ: 0.0 (s, 18H, trimethylsilyl), 1.02, 1.12 (s, 12H, dimethylsilylene), 2.51 (dd, 4H, methylene), 7.1 to 7.6 (m, 8H, Ar—H)

(2) Copolymerization

An autoclave of 1 L was charged with 500 mL of liquid propylene and then charged with a heptane solution (2 M, 1.0 mmol, 0.5 mL) of triisobutylaluminum from a catalyst-injection tube together with 5 mL of heptane at a room temperature.

On the other hand, a Schlenk bottle of 50 mL was charged under nitrogen flow with 5 ml of degassed heptane, a heptane solution (2 M, 0.5 mmol, 0.25 mL) of triisobutylaluminum, a heptane slurry (Al carrying amount: 22.8 mass %, 0.3 mmol, 0.78 mL, 0.38 mmol/mL) of silica-carried methylaluminoxane (MAO) manufactured by Witco Co., Ltd., dimethylsilylenebis-(2-methylbenzoindenyl)zirconium dichloride (0.2 μmol, 0.01 mL) and (1,2'-dimethylsilylene)(2,1'-dimethylsilylene)-bis(3-trimethylsilylmethylindenyl)-zirconium dichloride (0.4 μmol, 0.02 mL), and the mixture was stirred at a room temperature for 3 minutes.

After finishing stirring, the catalyst slurry was introduced from the catalyst-injection tube by means of high pressure nitrogen at 35° C. while stirring (400 rpm)

The injection tube was charged with 10 mL of heptane for the purpose of washing the injection tube, and the heptane was introduced into propylene by high pressure nitrogen.

Then, the temperature was elevated up to 40° C. in 5 minutes to polymerize propylene as it was for 10 minutes.

Next, ethylene was injected thereinto so that an ethylene partial pressure was 0.25 MPa. The polymerization temperature was maintained at 40° C.

After 15 minutes passed, 3 mL of methanol was injected from the injection tube followed by slowly drawing out unreacted gas, and a powder obtained was heated and dried to thereby obtain a propylene-ethylene block copolymer.

The evaluation results of the resin characteristics of the polymer thus obtained are shown in Table 1.

Example 2

An autoclave of 1 L was charged with 500 mL of liquid propylene and then charged with a heptane solution (2 M, 1.0 mmol, 0.5 mL) of triisobutylaluminum from a catalyst-injection tube together with 5 ml of heptane at a room temperature. Next, hydrogen was injected thereinto at 0.03 MPa.

On the other hand, a Schlenk bottle of 50 mL was charged under nitrogen flow with 5 mL of degassed heptane, a heptane solution (2 M, 0.5 mmol, 0.25 mL) of triisobutylaluminum, a heptane slurry (Al carrying amount: 22.8 mass %, 0.5 mmol, 1.25 mL, 0.38 mmol/mL) of silica-carried methylaluminoxane (MAO) available from Witco Co., Ltd., dimethylsilylenebis-(2-methylbenzoindenyl)zirconium dichloride (0.2 µmol, 0.01 mL) and (1,2'-dimethylsilylene)(2,1'-dimethylsilylene)-bis(3-trimethylsilylmethylindenyl) zirconium dichloride (0.8 µmol, 0.08 mL), and the mixture was stirred at a room temperature for 3 minutes.

After finishing stirring, 2.8 mL of the catalyst slurry was injected from the catalyst-injection tube by means of high pressure nitrogen at 45° C. while stirring (400 rpm).

The injection tube was charged with 10 mL of heptane for the purpose of washing the injection tube, and the heptane was introduced into propylene by high pressure nitrogen.

Thereafter, the temperature was elevated up to 55° C. in 5 minutes to polymerize propylene as it was for 20 minutes.

Then, the temperature was elevated up to 55° C. in 5 minutes.

Next, ethylene was injected thereinto so that an ethylene partial pressure was 0.25 MPa. The polymerization temperature was maintained at 55° C.

After 15 minutes passed, 3 mL of methanol was injected from the injection tube to slowly draw out unreacted gas, and a powder obtained was heated and dried to thereby obtain a propylene-ethylene block copolymer.

The evaluation results of the resin characteristics of the polymer thus obtained are shown in Table 1.

Example 3

The autoclave of 1 L was charged with 500 mL of liquid propylene and then charged with a heptane solution (2 M, 1.0 mmol, 0.5 mL) of triisobutylaluminum from a catalyst-injection tube together with 5 ml of heptane at a room temperature. Next, hydrogen was injected thereinto at 0.03 MPa.

On the other hand, the Schlenk bottle of 50 mL was charged under nitrogen flow with 5 mL of degassed heptane, a heptane solution (2 M, 0.5 mmol, 0.25 mL) of triisobutylaluminum, a heptane slurry (Al carrying amount: 22.8 mass %, 0.9 mmol, 2.4 ml, 0.38 mmol/mL) of silica carrying methylaluminoxane (MAO) available from Witco Co., Ltd., dimethylsilylenebis(2-methylbenzoindenyl)zirconium dichloride (0.2 µmol, 0.01 ml) and (1,2'-dimethylsilylene)(2,1'-dimethylsilylene)-bis(3-trimethylsilylmethylindenyl) zirconium dichloride (1.6 µmol, 0.16 mL), and the mixture was stirred at a room temperature for 3 minutes.

After the termination of stirring, 2.5 mL of the catalyst slurry was introduced from the catalyst-injection tube by means of high pressure nitrogen at 35° C. while further stirring (400 rpm).

The injection tube was charged with 10 mL of heptane for the purpose of washing the injection tube, and the heptane was introduced into propylene by means of high pressure nitrogen.

Thereafter, the temperature was elevated up to 40° C. in 5 minutes to polymerize propylene as it was for 22 minutes.

Then, the temperature was elevated up to 55° C. in 5 minutes.

Next, ethylene was injected thereinto so that an ethylene partial pressure was 0.2 MPa. The polymerization temperature was maintained at 55° C.

After 10 minutes passed, 3 mL of methanol was introduced from the injection tube to followed by slowly drawing out unreacted gas, and a powder obtained was heated and dried to thereby obtain a propylene-ethylene block copolymer.

The evaluation results of the resin characteristics of the polymer thus obtained are shown in Table 1.

Example 4

(1) Synthesis of (1,2'-dimethylsilylene)(2,1'-dimethylsilylene)-bis(3-n-butylindenyl)zirconium dichloride A Schlenk bottle was charged with 0.83 g (2.4 mmol) of (1,2'-dimethylsilylene)(2,1'-dimethylsilylene)-bis(indene) and 50 mL of ether.

The bottle was cooled down to −78° C. and charged with 3.1 mL (5.0 mmol) of n-BuLi (hexane solution 1.6 M), and then it was stirred at a room temperature for 12 hours.

The solvent was distilled off, and the resultant solid matter was washed with 20 mL of hexane, whereby 1.1 g (2.3 mmol) of an ether adduct of the lithium salt was obtained.

The above ether adduct of the lithium salt was dissolved in 50 mL of THF, and the solution was cooled down to −78° C.

n-Butyl bromide 57 mL (5.3 mmol) was slowly dropwise added thereto and stirred at a room temperature for 12 hours.

The solvent was distilled off, and the residue was extracted with 50 ml of hexane, followed by removing the solvent to thereby obtain 0.81 g (1.77 mmol) of (1,2'-dimethylsilylene)(2,1'-dimethylsilylene)-bis(3-n-butylindene). (yield: 74%)

Next, the Schlenk bottle was charged with 0.81 g (1.77 mmol) of (1,2'-dimethylsilylene)(2,1'-dimethylsilylene)-bis (3-n-butylindene) described above and 100 mL of ether under nitrogen flow.

The bottle was cooled down to −78° C. and charged with 2.7 mL (4.15 mmol) of n-BuLi (hexane solution 1.54 M), and then it was stirred at a room temperature for 12 hours.

The solvent was distilled off, and the resultant solid matter was washed with hexane, whereby 0.28 g (1.43 mmol) of ether adduct of the lithium salt was obtained.

The ether adduct of the lithium salt described above was dissolved in 50 mL of toluene under nitrogen flow.

The solution was cooled down to −78° C., and 50 mL of a toluene suspension of 0.33 g (1.42 mmol) of zirconium tetrachloride which was cooled in advance to −78° C. was dropwise added thereto.

After dropwise added, the solution was stirred at a room temperature for 6 hours.

Next, after filtering, the solvent was distilled off, and the residue was recrystallized from dichloromethane to thereby obtain 0.2 g (0.32 mmol) of (1,2'-dimethylsilylene)(2,1'-dimethylsilylene)-bis(3-n-butylindenyl)zirconium dichloride. (yield: 22%)

Measured value of $^1$H-NMR (90 MHz, CDCl$_3$)

δ: 0.88, 0.99 (12H, dimethylsilylene), 0.7 to 1.0, 1.1 to 1.5 (18H, n-Bu), 7.0 to 7.6 (8H, benzene ring proton)

(2) Copolymerization

The autoclave of 1 L was charged with 500 mL of liquid propylene and then charged with a heptane solution (2 M, 1.0 mmol, 0.5 mL) of triisobutylaluminum from a catalyst-injection tube together with 5 ml of heptane at a room temperature. Next, hydrogen was injected thereinto at 0.03 MPa.

On the other hand, the Schlenk bottle of 50 mL was charged under nitrogen flow with 5 ml of degassed heptane, a heptane solution (2 M, 0.5 mmol, 0.25 mL) of triisobutylaluminum, a heptane slurry (Al carrying amount: 22.8 mass %, 1.6 mmol, 4.2 ml, 0.38 mmol/mL) of silica carrying methylaluminoxane (MAO) anailable from Witco Co., Ltd., dimethylsilylenebis(2-phenylindenyl)zirconium dichloride (0.2 μmol, 0.01 mL) and (1,2μ-dimethylsilylene)(2,1μ-dimethylsilylene)-bis(3-n-butylindenyl)zirconium dichloride (3.0 μmol, 0.30 mL), and the mixture was stirred at a room temperature for 3 minutes.

After finishing stirring, 4.9 mL of the catalyst slurry was introduced from the catalyst-injection tube by means of high pressure nitrogen at 35° C. while stirring (400 rpm).

The injection tube was charged with 10 mL of heptane for the purpose of washing the injection tube, and the heptane was introduced into propylene by means of high pressure nitrogen.

Thereafter, the temperature was elevated up to 40° C. in 5 minutes to polymerize propylene as it was for 20 minutes.

Then, the temperature was elevated up to 55° C. in 5 minutes.

Next, ethylene was injected thereinto so that an ethylene partial pressure was 0.1 MPa. The polymerization temperature was maintained at 55° C.

After 40 minutes passed, 3 mL of methanol was injected from the injection tube followed by slowly drawing out unreacted gas, and a powder obtained was heated and dried to thereby obtain a propylene-ethylene block copolymer.

The evaluation results of the resin characteristics of the polymer thus obtained are shown in Table 1.

Dimethylsilylenebis(4-phenylindenyl)zirconium dichloride was synthesized in accordance with the description in Japanese Unexamined Patent Application Laid-Open No. 100579/1994.

Example 5

(Preliminary Polymerization)

A Schlenk bottle of 500 mL equipped with stirring blades was dipped in a water bath of 10° C. and charged with 2.0 g (Al carrying amount: 22.8 mass %) of silica carrying methylaluminoxane (MAO) available from Witco Co., Ltd. and 40 mL of dehydrated toluene under nitrogen flow, and the mixture was stirred for a while.

Dimethylsilylenebis(benzoindenyl)zirconium dichloride (9.0 μmol) and (1,2'-dimethylsilylene)-(2,1'-dimethylsilylene)-bis(3-trimethylsilylmethyl-indenyl)zirconium dichloride (13.5 μmol) were added in order under stirring, and the solution was further stirred for 25 minutes.

Then, propylene was injected at 0.16 MPa to maintain a pressure of propylene for 2 hours.

After removing the pressure, the contents of the bottle was purged by nitrogen, and a mass of the whole bottle was measured to find that the mass was increased by 2.5 g.

Next, the solvent of the supernatant was removed by decantation, and then the preliminary polymerization catalyst was washed three times with 50 mL of dehydrated heptane. Lastly, dehydrated heptane of an amount which was removed in the first decantation was added again to obtain a heptane slurry of the preliminary polymerization catalyst.

(Copolymerization)

An autoclave of 5 L was charged with liquid propylene (2 L) and then charged with a heptane solution (2 M, 5.0 mmol, 2.5 mL) of triisobutylaluminum from a catalyst-injection tube together with heptane (5 mL) at a room temperature, and the temperature was elevated up to 55° C.

Next, the catalyst slurry (1.9 mL) described above was introduced from the catalyst injection tube by means of high pressure nitrogen (3.0 MPa) while stirring at 400 rpm.

Further, the catalyst injection tube was charged with dehydrated heptane (5 mL) for the purpose of washing the injection tube, and it was thrown into the autoclave by high pressure nitrogen.

Next, polymerization was carried out at 55° C. for 30 minutes, and then ethylene was injected so that an ethylene partial pressure was 0.2 MPa.

Ethylene was continued to be injected for 60 minutes so that an ethylene partial pressure of 0.2 MPa was maintained.

After the termination of the polymerization reaction, methanol (5 mL) was injected from the injection tube followed by slowly drawing out unreacted gas, and a powder obtained was heated and dried to thereby obtain a propylene-ethylene block copolymer.

The evaluation results of the resin characteristics of the polymer thus obtained are shown in Table 1.

Example 6

Reaction and operation were carried out in the same manners as in Example 5, except that in the copolymerization of Example 5, an ethylene partial pressure was changed to 0.1 MPa.

The evaluation results of the resin characteristics of the polymer thus obtained are shown in Table 1.

Example 7

(Preliminary Polymerization)

The Schlenk bottle of 500 mL equipped with stirring blades was dipped in a water bath of 10° C. and charged with 2.4 g (Al carrying amount: 22.8 mass %) of silica carrying methylaluminoxane (MAO) available from Witco Co., Ltd. and dehydrated toluene (40 mL) under nitrogen flow, and the mixture was stirred for a while.

Dimethylsilylenebis(benzoindenyl)zirconium dichloride (14.0 μmol) and (1,2'-dimethylsilylene)-(2,1'-dimethylsilylene)-bis(3-trimethylsilylmethyl-indenyl)zirconium dichloride (14.0 μmol) were added in order under stirring, and the solution was stirred for 25 minutes.

Then, propylene was injected at 0.14 MPa to maintain a pressure of propylene for one hour.

After removing the pressure, the contents of the bottle was replaced with nitrogen, and a mass of the whole bottle was measured to find that the mass was increased by 4.0 g.

Next, the solvent of the supernatant was removed by decantation, and then the preliminary polymerization catalyst was washed three times with 50 ml of dehydrated heptane. Lastly, dehydrated heptane of an amount which was removed in the first decantation was added again to obtain a heptane slurry of the preliminary polymerization catalyst.

(Copolymerization)

The autoclave of 5 L was charged with liquid propylene (2 L) and then charged with a heptane solution (2 M, 5.0 mmol, 2.5 mL) of triisobutylaluminum from a catalyst-injection tube together with heptane (5 mL) at a room temperature, and the temperature was elevated up to 55° C.

Next, the catalyst slurry (3.0 mL) described above was introduced from the catalyst injection tube by means of high pressure nitrogen (3.0 MPa) while stirring at 400 rpm.

Further, the catalyst-injection tube was charged with dehydrated heptane (5 mL) for the purpose of washing the injection tube, and it was thrown into the autoclave by means of high pressure nitrogen.

Next, polymerization was carried out at 55° C. for 30 minutes, and then ethylene was injected so that an ethylene partial pressure was 0.25 MPa.

Ethylene was continued to be injected for 60 minutes so that an ethylene partial pressure of 0.2 MPa was maintained.

After finishing the polymerization reaction, methanol (5 mL) was injected from the injection tube followed by slowly drawing out unreacted gas, and a powder obtained was heated and dried to thereby obtain a propylene-ethylene block copolymer.

The evaluation results of the resin characteristics of the polymer thus obtained are shown in Table 1.

Comparative Example 1

(Preliminary Polymerization)

A glass-made reactor having a capacity of 1 L equipped with a stirrer was sufficiently purged with nitrogen gas and then charged with 400 mL of heptane.

The inside of the reactor was maintained at a temperature of 20° C. and charged with 28 mmol of triethylaluminum, 2.8 mmol of dicyclopentyldimethoxysilane and 5 g of a titanium trichloride catalyst ("XP-40" available from Marubeni Solvay Chemical Co., Ltd., and then propylene was continuously introduced into the reactor for one hour so that it accounted for 3 g per g of the catalyst. The temperature was maintained at 20° C. during the reaction.

After stopping feeding of propylene, the reactor was sufficiently purged with nitrogen gas, and titanium-containing polypropylene was washed four times with refined heptane.

The results of the analysis showed that 2.9 g of propylene per g of the catalyst was polymerized.

(Copolymerization)

A stainless-made autoclave reactor having a capacity of 300 L equipped with a stirrer was sufficiently purged with nitrogen gas and then charged with 200 liter of liquid propylene, 1 mol % of hydrogen, 120 mmol of triethylaluminum and 29.5 mmol of dicyclopentyldimethoxysilane. The inside of the reactor was heated to a temperature of 70° C. and then charged with 2.6 g of titanium-containing polypropylene obtained in the preliminary polymerization as the catalyst under nitrogen gas atmosphere.

Next, propylene was polymerized at 55° C. for 20 minutes.

Then, ethylene was fed to control an ethylene gas concentration to 13 mol %.

Ethylene was continuously fed so that an ethylene gas concentration was 13 mol %, and propylene was copolymerized with ethylene at 55° C. for 120 minutes.

The polymer slurry was allowed to pass through a liquid cyclone, and liquid propylene was returned to the polymerization bath. The copolymer particles were sent to a flash tank to vaporize liquid propylene to obtain the copolymer particles.

The evaluation results of the resin characteristics of the polymer thus obtained are shown in Table 1.

Comparative Example 2

An autoclave of 1 L was charged with 500 mL of liquid propylene and then charged with a heptane solution (2 M, 1.0 mmol, 0.5 mL) of triisobutylaluminum from a catalyst injection tube together with 5 mL of heptane at a room temperature.

On the other hand, a Schlenk bottle of 50 mL was charged under nitrogen flow with 5 mL of degassed heptane, a heptane solution (2 M, 0.5 mmol, 0.25 mL) of triisobutylaluminum, a heptane slurry (Al carrying amount: 22.8 mass %, 0.1 mmol, 0.26 mL, 0.38 mmol/mL) of silica carrying methylaluminoxane (MAO) available from Witco Co., Ltd. and dimethylsilylenebis(2-methylbenzoindenyl)zirconium dichloride (0.2 μmol, 0.01 mL), and the mixture was stirred at a room temperature for 3 minutes.

After the termination of stirring, 5.0 mL of the catalyst slurry was introduced from the catalyst injection tube by means of high pressure nitrogen at 35° C. while further stirring (400 rpm).

The injection tube was charged with 10 mL of heptane for the purpose of washing the injection tube, and the heptane was introduced into propylene by means of high pressure nitrogen.

Then, the temperature was elevated up to 40° C. in 5 minutes to polymerize propylene as it was for 10 minutes.

Next, ethylene was injected thereinto so that an ethylene partial pressure was 0.35 MPa. The polymerization temperature was maintained at 40° C.

After 15 minutes passed, 3 mL of methanol was introduced from the injection tube followed by slowly drawing out unreacted gas, and a powder obtained was heated and dried to thereby obtain a propylene-ethylene block copolymer.

The evaluation results of the resin characteristics of the polymer thus obtained are shown in Table 1.

Comparative Example 3

Reaction and operation were carried out in the same manners as in Comparative Example 2, except that (1,2'-dimethylsilylene)(2,1'-dimethylsilylene)-bis(3-trimethylsilylmethylindenyl)zirconium dichloride was used.

The evaluation results of the resin characteristics of the polymer thus obtained are shown in Table 1.

TABLE 1

| | Example | | | | | | | Comparative Example | | |
|---|---|---|---|---|---|---|---|---|---|---|
| | 1 | 2 | 3 | 4 | 5 | 6 | 7 | 1 | 2 | 3 |
| Ethylene content (mole %) | 5.5 | 4.8 | 4.1 | 2.5 | 5.7 | 2.8 | 6.0 | 20.5 | — | — |
| [η] (dL/g) | 1.7 | 3.4 | 3.6 | 3.8 | 3.8 | 4.1 | 3.9 | 7.2 | 1.35 | 4.2 |
| Xylene-soluble fraction [η] (dL/g) | 2.5 | 3.8 | 4.2 | 3.9 | 3.3 | 3.8 | 4.2 | 6.8 | 0.9 | 4.2 |
| Morphology | A | A | A | A | AA | AA | AA | A | C | C |
| $f_{EEE}$ (mole %) | 0 | 0 | 0 | 0 | 0 | 0 | 0 | 0.12 | 0 | 0 |
| R1 · R2 | 1.17 | 1.37 | 1.38 | 1.31 | 1.21 | 1.34 | 1.28 | 4.01 | 1.2 | 1.31 |
| 0° C. soluble fraction of TREF (mass %) | 37 | 39 | 41 | 43 | 36 | 33 | 21 | 31 | 32 | 95 |
| Tensile elastic modulus (MPa) | 270 | 103 | 71 | 81 | 86 | 107 | 194 | 70.5 | 144 | 72 |
| Internal haze (%) | 32 | 51 | 41 | 35 | 28 | 32 | 25 | 81 | 25 | 10 |
| Transparency | A | A | A | A | A | A | A | C | A | A |

INDUSTRIAL APPLICABILITY

The carried catalyst of the present invention in which a metallocene catalyst preparing low crystalline polypropylene is combined with a metallocene catalyst preparing high crystalline polypropylene makes it possible to produce a propylene-ethylene block copolymer in which powder particles are not stuck and which has a high transparency.

What is claimed is:

1. A process for producing a propylene-ethylene block copolymer in which propylene is copolymerized with ethylene in the presence of a catalyst system comprising a metallocene catalyst (1), a metallocene catalyst (2), a porous carrier (3), at least one aluminoxane (4) and/or compound (4) which can form an ionic complex by reacting with the metallocene catalysts described above and, optionally, an organic aluminum compound (5), wherein the metallocene catalyst (1) is a monocross-linked metallocene catalyst, and the metallocene catalyst (2) is a dicross-linked metallocene catalyst, and wherein the monocross-linked metallocene catalyst is a transition metal compound represented by general formula (I):

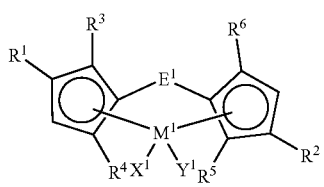

(I)

wherein E1 represents a bonding group which cross-links two conjugate five-membered ring ligands; R1 and R2 each represent a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; R3 to R6 each represent hydrogen, a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; M1 represents a transition metal of the IV to VI group in the periodic table; X1 and Y1 each represent a covalent bonding ligand; and X1 and Y1 may be combined with each other to form a ring structure;

and the dicross-linked metallocene catalyst is a transition metal compound represented by general formula (II) or general formula (III):

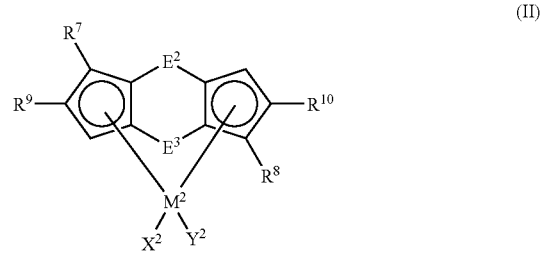

(II)

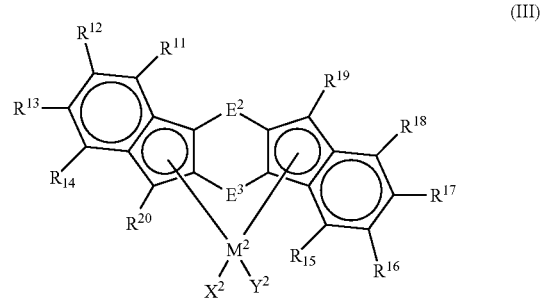

(III)

wherein E2 and E3 independently represent a silylene group, an oligosilylene group, or a side chain lower alkyl or phenyl-substituted group thereof; R9 to R18 each represent hydrogen, a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; R7, R8, R19 and R20 each represent a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; M2 represents a transition metal of the IV to VI group in the periodic table; X2 and Y2 each represent a covalent bonding ligand; and X1 and Y1 may be combined with each other to form a ring structure.

2. The process for producing a propylene-ethylene block copolymer as described in claim 1, wherein propylene is polymerized in a first step, and propylene and ethylene are random-copolymerized in a second step.

3. The process for producing the propylene-ethylene block copolymer as described in claim 2, wherein the propylene-ethylene block copolymer satisfies the following requirement of:

(1) a triad chain fraction fEEE of [EEE]≦0.01 (mole %),
(2) R1·R2≧0.5,
(3) its intrinsic viscosity [η]≧1.0 dl/g, and
(4) an intrinsic viscosity [η] of a xylene-soluble fraction ≧1.0 dl/g.

4. The method as claimed in claim 1, wherein E2 and E3 independently represent a silylene, dimethylsilylene, methylphenylene, diphenylsilylene, disilylene, and tetramethyldisilylene group.

5. The method as claimed in claim 1, wherein said catalyst system comprises at least one aluminoxane.

6. The method as claimed in claim 2, wherein said catalyst system comprises at least one aluminoxane.

7. A propylene-ethylene block copolymer produced by the process as described in claim 1.

8. The propylene-ethylene block copolymer as described in claim 7, wherein an elastic modulus E is less than 330 (MPa), and an internal haze H is less than 55(%).

9. A propylene-ethylene block copolymer produced by the process as described in claim 2.

10. The propylene-ethylene block copolymer as described in claim 9, wherein an elastic modulus E is less than 330 (MPa), and an internal haze H is less than 55(%).

11. A process for producing a propylene-ethylene block copolymer in which propylene is copolymerized with ethylene in the presence of a catalyst system comprising a metallocene catalyst (1), a metallocene catalyst (2), a porous carrier (3), at least one aluminoxane (4) and/or compound (4) which can form an ionic complex by reacting with the metallocene catalysts described above and, optionally, an organic aluminum compound (5),
wherein the metallocene catalyst (1) is a monocross-linked metallocene catalyst, and the metallocene catalyst (2) is a dicross-linked metallocene catalyst, and
wherein the monocross-linked metallocene catalyst is dimethylsilylenebis(2-methylbenzoindenyl)zirconium dichloride or dimethylsilylenebis(2-methyl-4-phenylindenyl)zirconium dichloride, and the dicross-linked metallocene catalyst is (1,2'-dimethylsilylene)(2,1'-dimethylsilylene)-bis(3-trimethylsilylmethylindenyl) zirconium dichloride or (1,2'-dimethylsilylene)(2,1'-dimethylsilylene)-bis(3-n-butylindenyl)zirconium dichloride.

12. The process for producing a propylene-ethylene block copolymer as described in claim 11, wherein propylene is polymerized in a first step, and propylene and ethylene are random-copolymerized in a second step.

13. The process for producing the propylene-ethylene block copolymer as described in claim 12, wherein the propylene-ethylene block copolymer satisfies the following requirement of:
(1) a triad chain fraction fEEE of [EEE]≦0.1 (mole %),
(2) R1·R2≧0.5,
(3) its intrinsic viscosity [η]≧1.0 dl/g, and
(4) an intrinsic viscosity [η] of a xylene-soluble fraction≧1.0 dl/g.

14. The method as claimed in claim 11, wherein said catalyst system comprises at least one aluminoxane.

15. A propylene-ethylene block copolymer produced by the process as described in claim 11.

16. The propylene-ethylene block copolymer as described in claim 15, wherein an elastic modulus E is less than 330 (MPa), and an internal haze H is less than 55(%).

17. A propylene-ethylene block copolymer produced by the process as described in claim 12.

18. The propylene-ethylene block copolymer as described in claim 17, wherein an elastic modulus B is less than 330 (MPa), and an internal haze H is less than 55(%).

* * * * *

UNITED STATES PATENT AND TRADEMARK OFFICE
CERTIFICATE OF CORRECTION

PATENT NO. : 7,259,215 B2
APPLICATION NO. : 10/534755
DATED : August 21, 2007
INVENTOR(S) : Masami Kanamaru et al.

Page 1 of 1

It is certified that error appears in the above-identified patent and that said Letters Patent is hereby corrected as shown below:

On the title page, Item (73), the Assignee information is incorrect. Item (73) should read:

-- (73) Assignee:  Prime Polymer Co., Ltd., Tokyo (JP) --

Signed and Sealed this

Twenty-fifth Day of March, 2008

JON W. DUDAS
*Director of the United States Patent and Trademark Office*